(12) United States Patent
Nakagawa et al.

(10) Patent No.: US 12,725,352 B2
(45) Date of Patent: Sep. 1, 2026

(54) INFORMATION PROCESSING DEVICE AND INFORMATION PROCESSING METHOD

(71) Applicant: Sony Interactive Entertainment Inc., Tokyo (JP)

(72) Inventors: Takeshi Nakagawa, Tokyo (JP); Takashi Hatakeda, Tokyo (JP); Kuniaki Oe, Tokyo (JP); Shizuka Ohara, Tokyo (JP); Haruka Iwaki, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 20 days.

(21) Appl. No.: 18/727,110

(22) PCT Filed: Dec. 19, 2022

(86) PCT No.: PCT/JP2022/046713
§ 371 (c)(1),
(2) Date: Jul. 8, 2024

(87) PCT Pub. No.: WO2023/140004
PCT Pub. Date: Jul. 27, 2023

(65) Prior Publication Data

US 2025/0157143 A1 May 15, 2025

(30) Foreign Application Priority Data

Jan. 18, 2022 (JP) ................................ 2022-005706

(51) Int. Cl.
*G06T 17/00* (2006.01)
*G02B 27/01* (2006.01)
(Continued)

(52) U.S. Cl.
CPC ............ *G06T 17/00* (2013.01); *G02B 27/017* (2013.01); *G06F 3/013* (2013.01); *G06T 5/50* (2013.01);
(Continued)

(58) Field of Classification Search
None
See application file for complete search history.

(56) References Cited

U.S. PATENT DOCUMENTS

| | | | | |
|---|---|---|---|---|
| 11,108,964 | B2 | 8/2021 | Kasuya et al. | |
| 11,127,212 | B1 * | 9/2021 | Wilens ................ | H04N 9/3179 |

(Continued)

FOREIGN PATENT DOCUMENTS

| | | | |
|---|---|---|---|
| EP | 3805899 | A1 | 4/2021 |
| JP | 2013225245 | A | 10/2013 |

(Continued)

OTHER PUBLICATIONS

International Search Report and Written Opinion mailed on Mar. 14, 2023, received for PCT Application PCT/JP2022/046713, filed on Dec. 19, 2022, 8 pages including English Translation.

(Continued)

*Primary Examiner* — Yanna Wu
(74) *Attorney, Agent, or Firm* — Kilpatrick Townsend & Stockton LLP

(57) ABSTRACT

An image generation device generates a look-around screen for allowing a user who wears a head-mounted display to look around a play area. The image generation device generates a map for estimating a position of the user, on the basis of a plurality of camera images obtained by capturing a space around the user in a plurality of directions by a camera of the head-mounted display. In the look-around screen, a predetermined special image is superimposed on an image indicating the play area, and a region which has
(Continued)

coincided with the line-of-sight direction of the user in a special image changes a display mode different than before. The special image is set to a space around the head-mounted display and narrower than a maximum range of the play area.

19 Claims, 15 Drawing Sheets

(51) Int. Cl.
*G06F 3/01* (2006.01)
*G06T 5/50* (2006.01)
*G06T 7/70* (2017.01)

(52) U.S. Cl.
CPC ...... *G06T 7/70* (2017.01); *G06T 2207/20221* (2013.01)

(56) References Cited

U.S. PATENT DOCUMENTS

| | | | | |
|---|---|---|---|---|
| 11,378,798 | B2 | 7/2022 | Ng-Thow-Hing | |
| 11,423,622 | B2 | 8/2022 | Okano et al. | |
| 12,175,601 | B2 | 12/2024 | Yoshikawa et al. | |
| 12,347,039 | B2 | 7/2025 | Fukuchi et al. | |
| 12,347,174 | B2 | 7/2025 | Wu et al. | |
| 2019/0235622 | A1* | 8/2019 | Tu | G06F 3/167 |
| 2023/0093342 | A1* | 3/2023 | Murugappan | G06T 7/30 |
| 2023/0177788 | A1* | 6/2023 | Aljubeh | G06T 7/579 345/633 |
| 2023/0237696 | A1 | 7/2023 | Inoue et al. | |

FOREIGN PATENT DOCUMENTS

| | | | |
|---|---|---|---|
| JP | 2016-090772 | A | 5/2016 |
| JP | 2017-096725 | A | 6/2017 |
| JP | 2019020997 | A | 2/2019 |
| JP | 2019534510 | A | 11/2019 |
| JP | 2020201572 | A | 12/2020 |
| JP | 2021060953 | A | 4/2021 |
| WO | 2017173850 | A1 | 10/2017 |
| WO | 2021153501 | A1 | 8/2021 |
| WO | 2021154558 | A1 | 8/2021 |
| WO | 2021200432 | A1 | 10/2021 |
| WO | 2022004503 | A1 | 1/2022 |

OTHER PUBLICATIONS

Office Action of Japanese application No. 2022-137724, Jun. 30, 2026: pp. 1-9 with English machine translation from the Japanese Patent Office.

* cited by examiner 300
303
304
(305)
306
302
301

INFORMATION PROCESSING DEVICE AND INFORMATION PROCESSING METHOD

CROSS-REFERENCE TO RELATED APPLICATIONS

The present application is based on PCT filing PCT/JP2022/046713, filed Dec. 19, 2022, which claims priority from Japanese Patent Application No. 2022-005706, filed Jan. 18, 2022, the entire contents of each are incorporated herein by reference.

TECHNICAL FIELD

The present invention relates to a data processing technique, and particularly to an information processing device and an information processing method.

BACKGROUND ART

An image display system in which a user who wears a head-mounted display can appreciate a target space from a freely selected viewpoint has been known. For example, electronic content which achieves virtual reality (VR) by setting a virtual three-dimensional space as a display object and causing an image corresponding to a line-of-sight direction of a user to be displayed on a head-mounted display has been known. With use of the head-mounted display, it is also possible to enhance a sense of immersion in a video and improve an operability of an application such as a game. In addition, a walk-through system in which a user who wears the head-mounted display can virtually walk around in a space displayed as a video if the user physically moves has also been developed.

SUMMARY

Technical Problem

In order to estimate a position of the user who wears the head-mounted display with high accuracy in an area where the user can move during a play of the application (also referred to as a “play area”), detailed map data is needed. Then, in order to obtain the detailed map data, the user who wears the head-mounted display provided with a camera is required to look around the surroundings of the user. In addition, it is desirable that the provision of a user experience (UX) which makes the user want to look around the surroundings be achieved with a reduced amount of a memory.

The present invention has been made in view of such problems above, and one object thereof is to provide a technique of achieving the provision of UX to the user who wears the head-mounted display, the UX which makes the user want to look around the surroundings thereof, with a small amount of the memory.

Solution to Problem

In order to solve the above problems, an information processing device according to an aspect of the present invention includes a look-around screen generating section which generates a look-around screen that is a screen for allowing a user who wears the head-mounted display to look around a play area in which the user is able to move during a play of an application, a display controlling section which causes the look-around screen to be displayed on the head-mounted display, and a map generating section which generates a map for estimating a position of the user in the play area, on the basis of a plurality of camera images obtained by capturing a space around the user in a plurality of directions by a camera of the head-mounted display. In the look-around screen, a predetermined special image is superimposed on an image indicating the play area, and, a region which has coincided with a line-of-sight direction of the user in the special image changes a display mode different than before, and the look-around screen generating section sets the special image in a space around the head-mounted display and narrower than a maximum range of the play area.

Another aspect of the present invention is an information processing method. In this method, a computer executes a step of generating a look-around screen that is a screen for allowing a user who wears the head-mounted display to look around a play area in which the user is able to move during a play of an application, a step of causing the look-around screen to be displayed on the head-mounted display, and a step of generating a map for estimating a position of the user in the play area, on the basis of a plurality of camera images obtained by capturing a space around the user in a plurality of directions by a camera of the head-mounted display. In the look-around screen, a predetermined special image is superimposed on an image indicating the play area, and, a region which has coincided with a line-of-sight direction of the user in the special image changes a display mode different than before, and the look-around screen generating section sets the special image in a space around the head-mounted display and narrower than a maximum range of the play area.

It is noted that any combinations of the components described above and the expressions of the present invention that are converted between a system, a computer program, a recording medium on which the computer program is readably recorded, a data structure, and the like are also effective as aspects of the present invention.

Advantageous Effect of Invention

According to the present invention, it is possible to achieve the provision of the UX which makes the user who wears the head-mounted display want to look around the surroundings thereof, to the user, with a small amount of the memory.

DESCRIPTION OF EMBODIMENT

Figure 1:
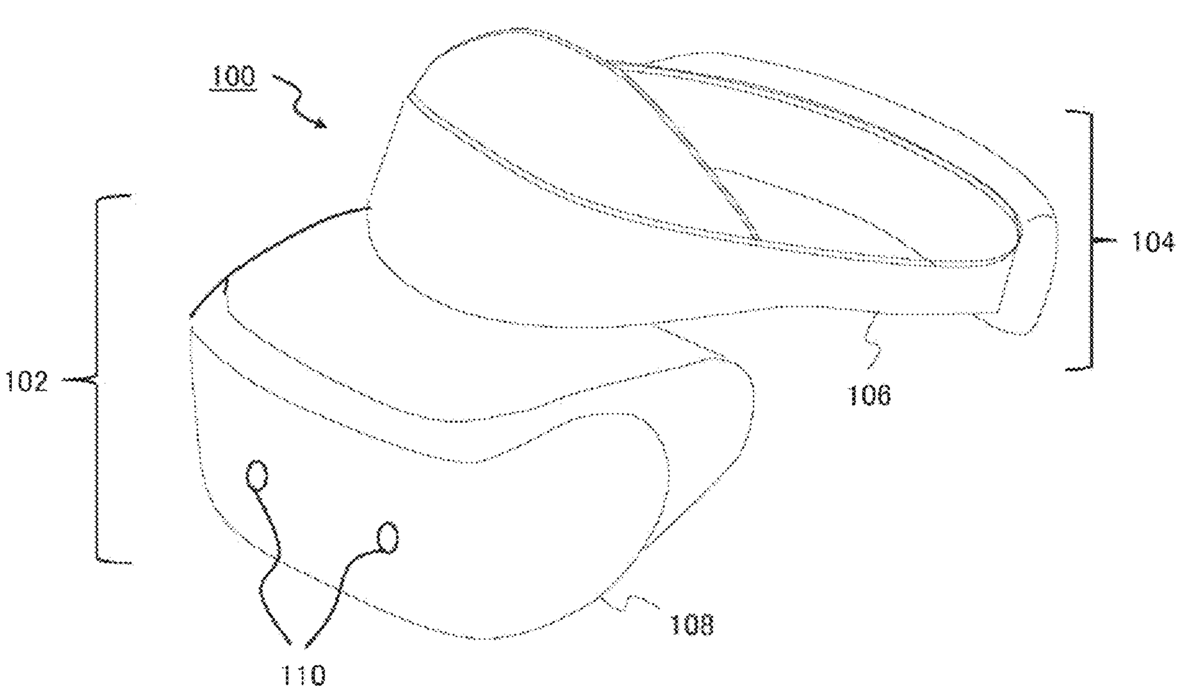
FIG. 1 is a view illustrating the appearance of a head-mounted display according to an embodiment.

The present embodiment relates to an image display system which displays an image of an application on a head-mounted display worn on a head of a user. FIG. 1 illustrates the appearance of a head-mounted display 100 according to the embodiment. The head-mounted display 100 includes an output mechanism section 102 and a mounting mechanism section 104. The mounting mechanism section 104 includes a mounting band 106 that achieves securing of the device around the user's head by being worn by the user.

The output mechanism section 102 includes a housing 108 having such a shape as to cover the user's right and left eyes in a state in which the head-mounted display 100 is worn by the user. A display panel is disposed inside the housing 108 and configured to face the eyes of the user when the user is wearing the device. It is assumed that the display panel of the head-mounted display 100 according to the embodiment is not transmissive. In other words, the head-mounted display 100 according to the embodiment is a light opaque head-mounted display.

The housing 108 may further include therein an eyepiece lens that is positioned between the display panel and the eyes of the user to enlarge the viewing angle of the user when the user is wearing the head-mounted display 100. The head-mounted display 100 may additionally include speakers or earphones that are placed at positions corresponding to those of ears of the user when the user is wearing the head-mounted display 100. Further, the head-mounted display 100 includes a built-in motion sensor to detect translational motions and rotational motions of the head of the user who wears the head-mounted display 100, as well as the position and the posture of the user's head at each time point.

Moreover, the head-mounted display 100 includes a stereo camera 110 at a front surface of the housing 108. The stereo camera 110 captures a moving image of the surrounding real space in the field of view corresponding to a line-of-sight direction of the user. When the captured image is immediately displayed, what is generally called video see-through is achieved to enable the user to view the situation of the real space in the direction in which the user faces, as it is. Further, augmented reality (AR) can be realized if a virtual object is drawn on an image of a real object appearing in the captured image. It is to be noted that the number of cameras included in the image display system 10 is not limited to any specific number, and the head-mounted display 100 may include one camera, or may include three or more cameras.

Figure 2:
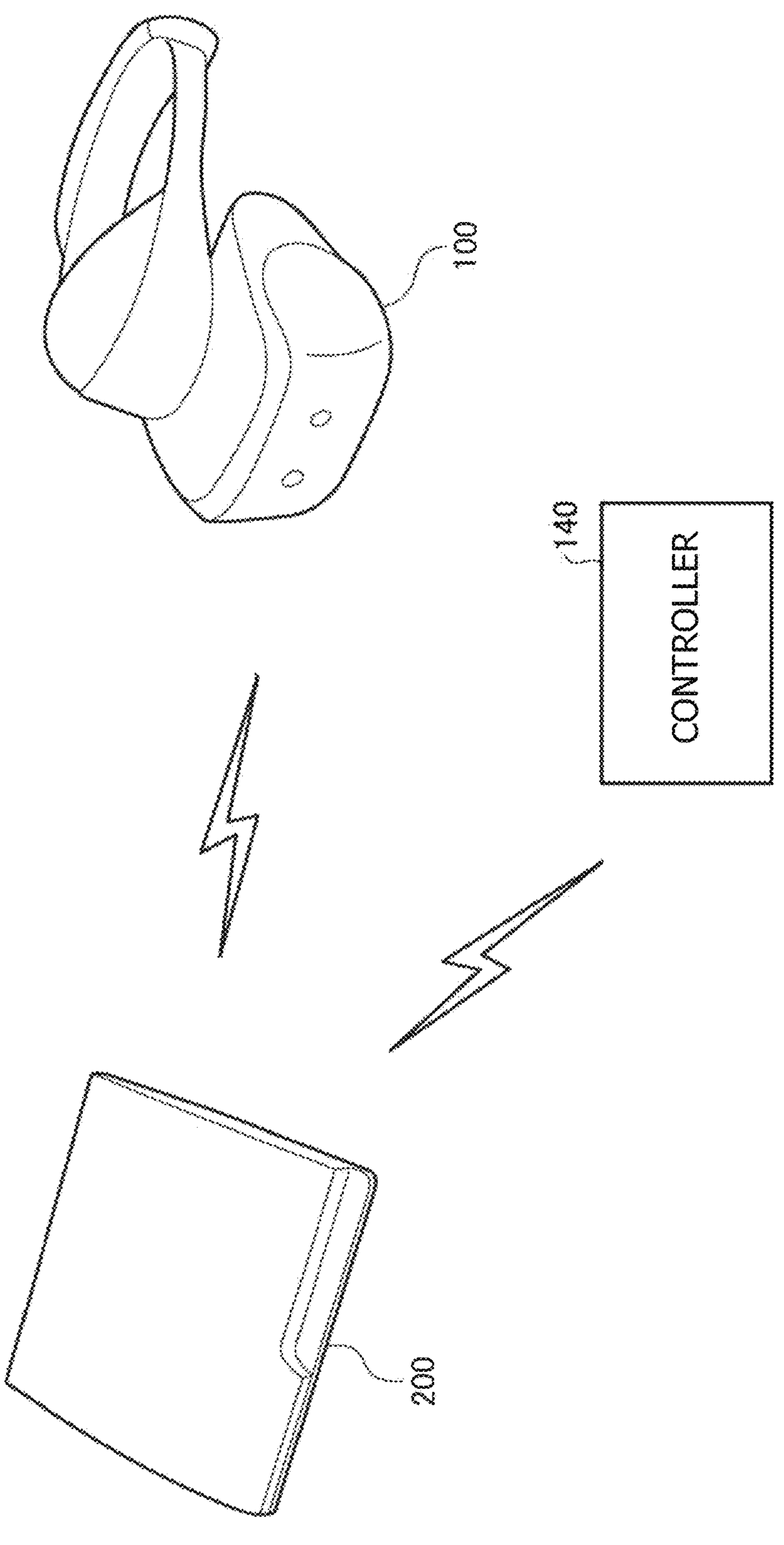
FIG. 2 is a view illustrating a configuration example of an image display system according to the embodiment.

FIG. 2 is a view illustrating a configuration example of the image display system 10 according to the embodiment. The image display system 10 includes the head-mounted display 100, an image generation device 200, and a controller 140. The head-mounted display 100 is connected to the image generation device 200 through wireless communication. The image generation device 200 may be further connected to a server through a network. In such a case, the server may supply, to the image generation device 200, the data regarding an online application such as a game in which a plurality of users can participate through the network.

The image generation device 200 is an information processing device that specifies the position of a viewpoint and the line-of-sight direction of the user according to the position and the posture of the head of the user wearing the head-mounted display 100, generates a display image in such a manner as to achieve a field of view that corresponds thereto, and outputs the generated display image to the head-mounted display 100. For example, the image generation device 200 may generate a display image representing a virtual world serving as a stage of an electronic game while allowing the electronic game to progress and cause the head-mounted display 100 to display the generated display image, or generate a moving image for the purpose of appreciation or information provision, irrespective of whether for a virtual world or the real world, and cause the head-mounted display 100 to display this moving image. Further, the image generation device 200 may cause the head-mounted display 100 to display a panoramic image having a wide angle of view that is centered on the user's viewpoint, whereby it is possible to impart the user with a deep sense of immersion into the display world. The image generation device 200 may be a stationary game console or a personal computer (PC).

The controller 140 is an input device (e.g., a game controller) that is gripped by a user's hand and used to input a user operation. The user operation includes an operation for controlling an image generation in the image generation device 200 and an operation for controlling an image display in the head-mounted display 100. The controller 140 is connected to the image generation device 200 by wireless communication. As a modified example, one of or both the head-mounted display 100 and the controller 140 may be connected to the image generation device 200 by wired communication via a signal cable or the like.

Figure 3:
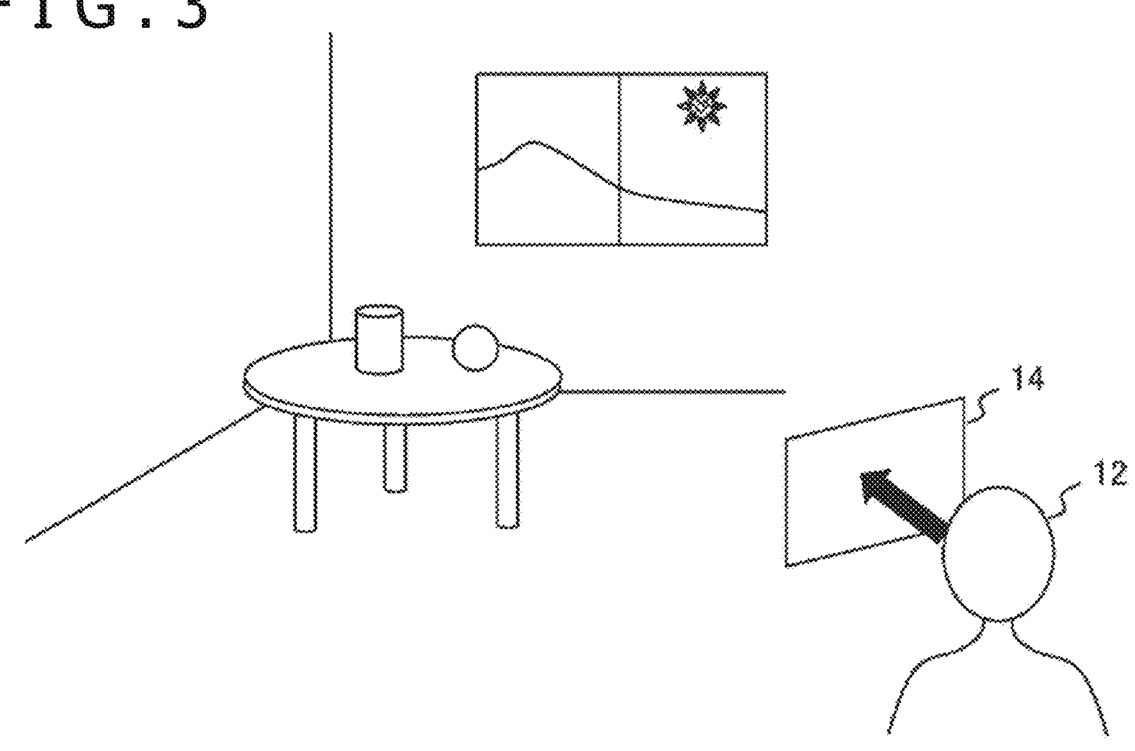
FIG. 3 is a view for describing an example of an image world that an image generation device causes the head-mounted display to display.

FIG. 3 is a view for describing an example of an image world that the image generation device 200 causes the head-mounted display 100 to display. The example of FIG. 3 creates a situation where a user 12 is in a room that is a virtual space. As depicted in FIG. 3, objects such as walls, a floor, a window, a table, and things on the table are disposed in a world coordinate system that defines the virtual space. For the world coordinate system, the image generation device 200 defines a view screen 14 according to the position of the viewpoint and the line-of-sight direction of the user 12, and represents images of the objects therein to draw a display image.

The image generation device 200 acquires, from the head-mounted display 100, the position of the viewpoint and the line-of-sight direction of the user 12 (these may be inclusively referred to as a "viewpoint" below, in some cases) at a predetermined rate, and causes the position and the posture of the view screen 14 to change according to the acquired viewpoint. This enables the head-mounted display 100 to display an image in the field of view corresponding to the user's viewpoint. Further, if the image generation device 200 generates stereo images with parallax and displays the stereo images respectively in the left and right regions of the display panel of the head-mounted display 100, it is also possible to allow the user 12 to stereoscopically view a virtual space. This enables the user 12 to experience a virtual reality as if the user 12 were in the room that is in the display world.

Figure 4:
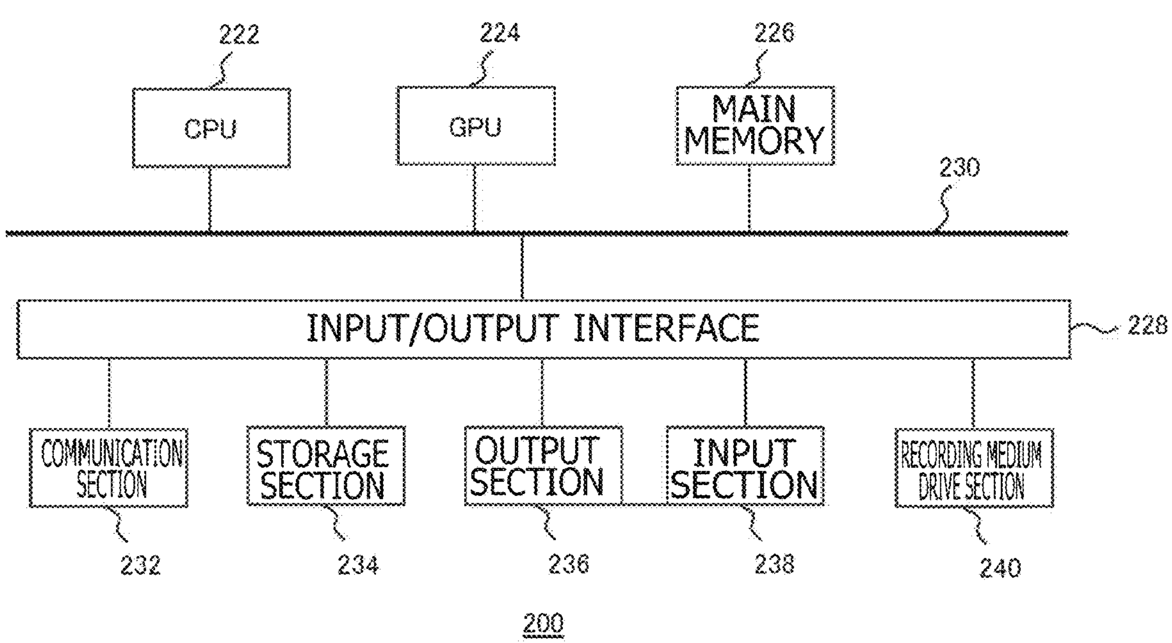
FIG. 4 is a diagram illustrating an internal circuit configuration of the image generation device.

FIG. 4 illustrates an internal circuit configuration of the image generation device 200. The image generation device 200 includes a central processing unit (CPU) 222, a graphics processing unit (GPU) 224, and a main memory 226. These components are interconnected through a bus 230. The bus 230 is further connected to an input/output interface 228. The input/output interface 228 is connected to a communication section 232, a storage section 234, an output section 236, an input section 238, and a recording medium drive section 240.

The communication section 232 includes peripheral device interfaces such as a universal serial bus (USB) and an Institute of Electrical and Electronics Engineers (IEEE) 1394, and a network interface such as a wired local area network (LAN) or a wireless LAN. The storage section 234 includes a hard disk drive, a nonvolatile memory, or the like. The output section 236 outputs data to the head-mounted display 100. The input section 238 accepts input of data from the head-mounted display 100, and also accepts input of data from the controller 140. The recording medium drive section 240 drives a removable recording medium such as a magnetic disk, an optical disk, or a semiconductor memory.

The CPU 222 provides overall control of the image generation device 200 by executing an operating system stored in the storage section 234. In addition, the CPU 222 executes various programs (for example, a VR game application or the like) that have been read out from the storage section 234 or a removable recording medium and loaded into the main memory 226, or downloaded via the communication section 232. The GPU 224 has a function of a geometry engine and a function of a rendering processor. In accordance with a drawing command from the CPU 222, the GPU 224 performs a drawing process and outputs a drawing result to the output section 236. One of or both the CPU 222 and the GPU 224 can also be referred to as a processor. The main memory 226 includes a random access memory (RAM), and stores data or a program that is necessary for processing.

Figure 5:
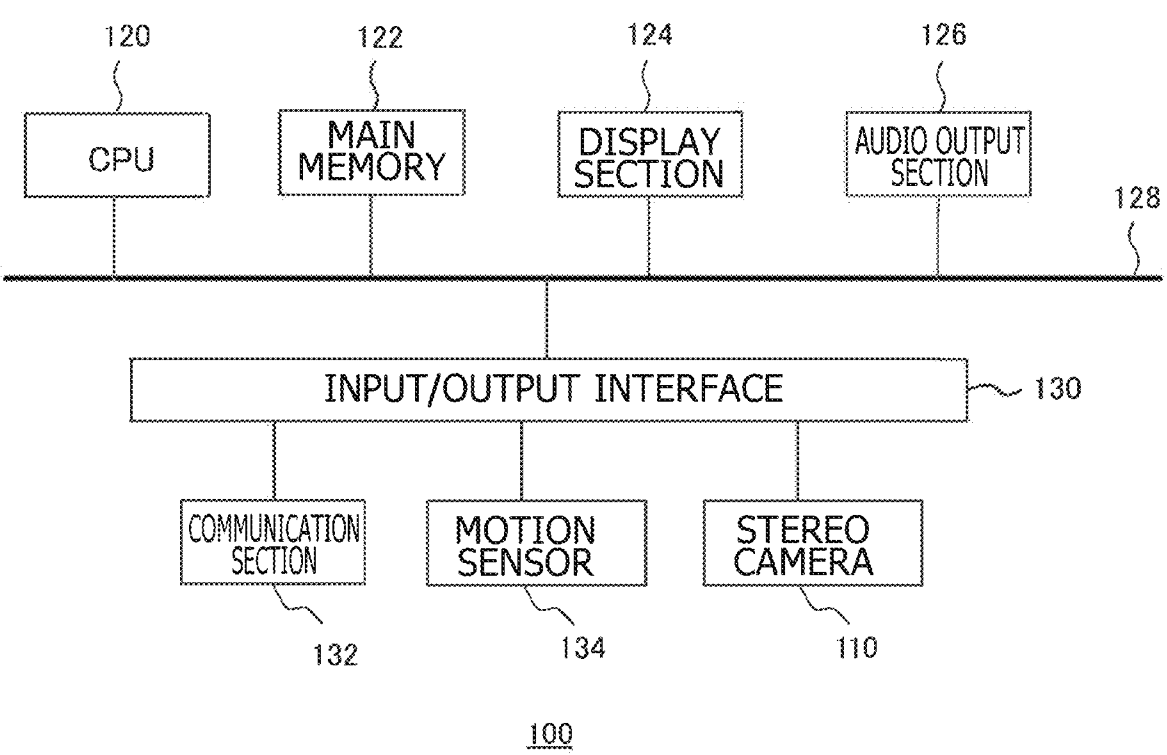
FIG. 5 is a diagram illustrating an internal circuit configuration of the head-mounted display.

FIG. 5 depicts an internal circuit configuration of the head-mounted display 100. The head-mounted display 100 includes a CPU 120, a main memory, a display section 124, and an audio output section 126. These components are interconnected via a bus 128. The bus 128 is further connected to an input/output interface 130. The input/output interface 130 is connected to a communication section 132 including an interface for wireless communication, a motion sensor 134, and a stereo camera 110.

The CPU 120 processes the information acquired from the components of the head-mounted display 100 via the bus 128 and supplies the audio output section 126 or the display section 124 with audio data or a display image obtained from the image generation device 200. The main memory 122 stores data or a program necessary for processing by the CPU 120.

The display section 124 includes a display panel such as a liquid crystal display panel or an organic electroluminescent (EL) panel and displays an image in front of the eyes of the user wearing the head-mounted display 100. The display section 124 may display a pair of stereo images in the panel regions corresponding to the right and left eyes to thereby achieve stereoscopic vision. The display section 124 may further include a pair of lenses that are positioned between the display panel and the eyes of the user wearing the head-mounted display 100 and that are used to expand a viewing angle of the user.

The audio output section 126 includes speakers or earphones positioned where the use's ears are located when the head-mounted display 100 is worn by the user, allowing the user to hear sounds. The communication section 132 is an interface that transmits and receives data to and from the image generation device 200. For example, the communication section 132 may be implemented by use of a known wireless communication technique such as Bluetooth (registered trademark). The motion sensor 134 includes an acceleration sensor and a gyro sensor and obtains the angular velocity and the acceleration of the head-mounted display 100.

As depicted in FIG. 1, the stereo camera 110 is a pair of video cameras that capture, from left and right viewpoints, an image of the surrounding real space by the field of view corresponding to the user's viewpoint. An image that is captured by the stereo camera 110 and in which the space surrounding the user appears is also referred to as a "camera image" below. The camera image can be said to be an image obtained by capturing the image of the real space in the user's line-of-sight direction (typically, in front of the user) and can also be said to be an image in which an object being present in the user's line-of-sight direction appears. Values measured by the motion sensor 134 and captured image (camera image) data acquired by the stereo camera 110 are transmitted as needed to the image generation device 200 through the communication section 132.

The image display system 10 according to the embodiment sets a play area of the user who wears the head-mounted display 100, the play area defining a real-world range where the user is able to move while playing an application. The play area can be said to be an allowed area or range around which the user can move during viewing of the virtual reality image (also referred to as a "VR image" below), in the surrounding space of the user (the space in the real world expanding around the user). In a case where, while playing the application, the user attempts to leave the play area or has left the play area, the image display system 10 presents a warning to the user in order to call a user's attention or prompt the user to return to the play area.

The application described above is assumed to be a game application which causes the head-mounted display 100 to display the VR image, and is called as a "VR game" below. The VR game may be, for example, a tennis game causing a VR image representing a tennis court in the virtual world to be displayed and causing the position of a character in the tennis court in the virtual world to be changed along with movement (walking or the like) of the user in the real world.

Characteristics of the image display system 10 according to the embodiment will be described. The image display system 10 executes tracking processing which estimates the position of the user who wears the head-mounted display 100 in the play area in which the user can move while playing the VR game, and causes a VR image corresponding to the position of the user to be displayed on the head-mounted display 100. In order to obtain the position of the user with high accuracy and stably in the tracking processing, detailed map data regarding the play area is needed. In addition, in order to obtain the detailed map data, the user who wears the head-mounted display 100 is required to look around the surroundings of the user. Moreover, it is desirable that the provision of the UX which makes the user want to look around the surroundings of the user be achieved with a reduced amount of memory.

In view of this, in the image display system 10 according to the embodiment, at the initial settings of the system, a look-around screen as a user interface (UI) including AR content which makes the user want to look around is provided. In addition, in the image display system 10 according to the embodiment, the countermeasure for saving the amount of memory regarding places that the user has viewed is provided, whereby the provision of the UX which makes the user want to look around the surroundings of the user is implemented with a reduced amount of memory.

Figure 6:
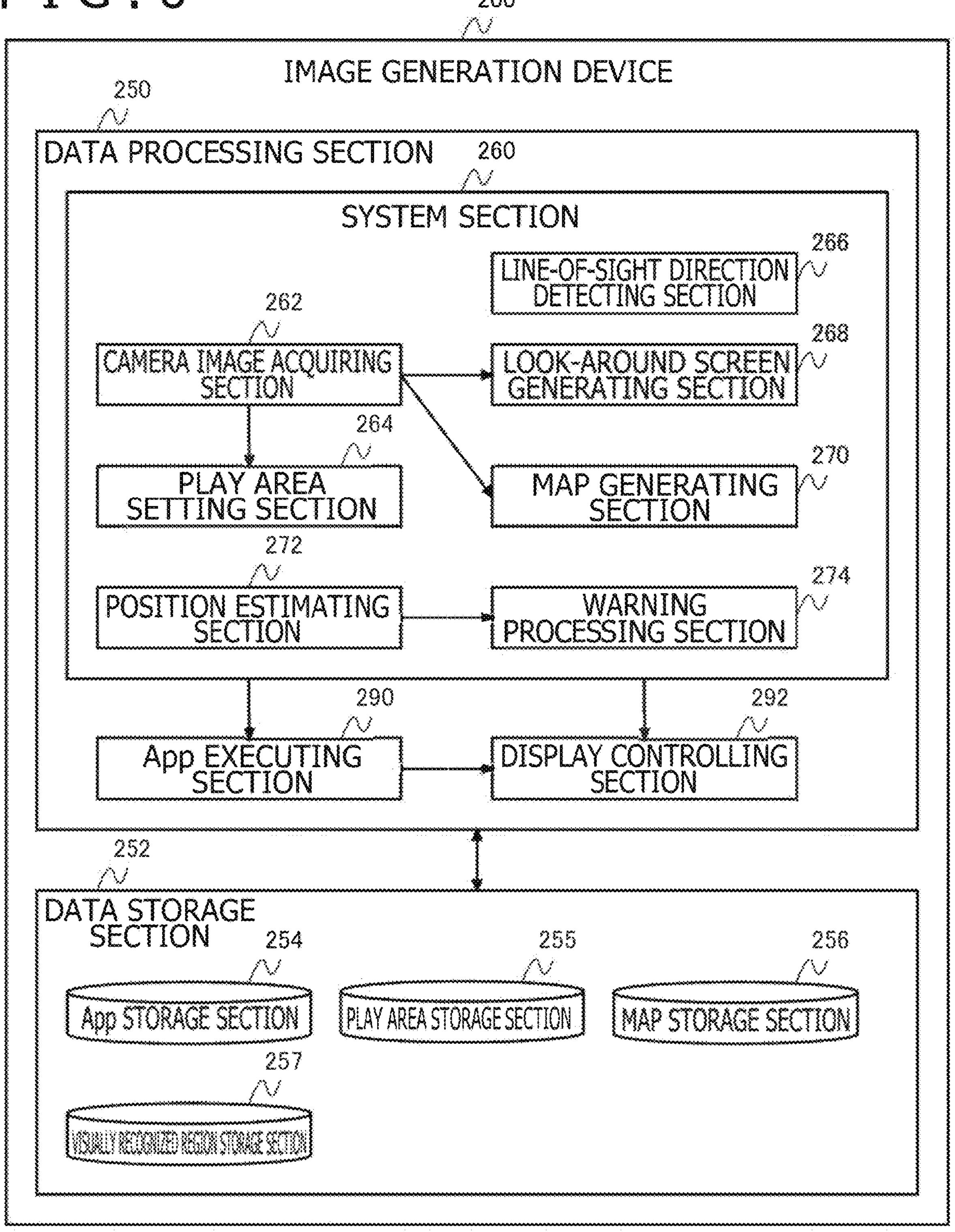
FIG. 6 is a block diagram illustrating functional blocks of the image generation device.

FIG. 6 is a block diagram illustrating functional blocks of the image generation device. The image generation device 200 executes various types of information processing such as progress of a VR game, communication of a server, or the like. However, FIG. 6 particularly illustrates the functional blocks relating to settings of the play area and the map data in details.

A plurality of functional blocks illustrated in FIG. 6 can be implemented by hardware including the CPU 222, the GPU 224, the main memory 226, the storage section 234 illustrated in FIG. 4 and can be implemented by software including a computer program having the functions of the plurality of functional blocks. Thus, it will be understood by those skilled in the art that the functional blocks may be variously implemented by hardware only, by software only, or by a combination of hardware and software. The method for implementing the functional blocks is not particularly limited to any one of them.

The image generation device 200 includes the data processing section 250 and the data storage section 252. The data processing section 250 executes various types of data processing. The data processing section 250 transmits and receives data to and from the head-mounted display 100 and the controller 140 through the communication section 232, the output section 236, and the input section 238 depicted in FIG. 4.

The data storage section 252 stores data that is referenced or updated by the data processing section 250. The data storage section 252 includes an App storage section 254, a play area storage section 255, a map storage section 256, and a visually recognized region storage section 257. The App storage section 254 stores data of an application that generates a VR image (a VR game in the embodiment).

The play area storage section 255 stores data regarding the play area. The data regarding the play area may include data indicating the position of a point cloud that forms the boundary of the play area (e.g., coordinate values of individual points in the world coordinate system).

The map storage section 256 stores map data for estimating the position of the head-mounted display 100 (that is, the position of the user who wears the head-mounted display 100). The map data in the embodiment includes an aggregate of an image (feature points appearing in the image) obtained by capturing a room (real space) where the user plays the VR game, and an image (feature points appearing in the image) in which a positional relation (position and direction) becomes clear. Specifically, the map data may include a plurality of sets in which the position of the head-mounted display 100, the line-of-sight direction, and a key frame are associated with each other. In addition, the map data may include other parameters that is necessary for what is generally called self-position estimation.

The key frame in a certain set is data representing features of an image viewed at the position and in the line-of-sight direction in the same set. The key frame in the embodiment is an image generated on the basis of a camera image captured by the stereo camera 110 of the head-mounted display 100, and is an image including a predetermined number or more of feature points. The number of feature points to be included in the key frame may be 24 or more. The feature points may include corners detected by a publicly known corner detection method, and may be detected on the basis of the gradient of luminance. The key frame can be said to be an aggregate of partial images (images of feature points) that is cropped out from the camera image.

The visually recognized region storage section 257 stores data representing a region that the user has visually recognized in the surrounding space of the head-mounted display 100 (in other words, the user) (in other words, a region that has coincided with the line-of-sight direction of the user and that is also referred to as a "visually recognized region" below).

The data processing section 250 includes a system section 260, an App executing section 290, and a display controlling section 292. The functions of the plurality of functional blocks may be implemented by a computer program. A processor of the image generation device 200 (for example, a CPU 222 and a GPU 224) may exert the functions of the above-mentioned plurality of functional blocks by loading the above-mentioned computer program into the main memory 226 from the storage section 234 or a recording medium and executing the loaded computer program.

The App executing section 290 reads out the data regarding an application selected by the user (a VR game in the embodiment), from the App storage section 254, and then executes the application selected by the user. The App executing section 290 generates an execution result of the application corresponding to the position of the head-mounted display 100 (in other words, the position of the user) estimated by the system section 260 (position estimating section 272 to be described later).

The display controlling section 292 transmits pieces of data on various images generated by the system section 260 and the App executing section 290 (for example, the VR image representing the result of execution of the VR game and the AR image) and various screens (including the look-around screen to be described later), to the head-mounted display 100. The display controlling section 292 causes these images and the screens to be displayed on the display section 124 of the head-mounted display 100.

The system section 260 executes system processing regarding the head-mounted display 100. The system section 260 provides a common service to a plurality of applications (e.g., VR games) for the head-mounted display 100. The common service includes setting of the play area, generation and setting of the map data, and position estimation of the user. The system section 260 includes a camera image acquiring section 262, a play area setting section 264, a line-of-sight direction detecting section 266, a look-around screen generating section 268, a map generating section 270, a position estimating section 272, and a warning processing section 274.

The camera image acquiring section 262 acquires data on the camera image captured by the stereo camera 110 of the head-mounted display 100 and transmitted from the head-mounted display 100.

The play area setting section 264 executes various types of processing for assisting the setting of the play area, and the play area setting section 264 detects and sets the play area on the basis of the camera image acquired by the camera image acquiring section 262 and the user's operation input through the controller 140. The play area setting section 264 stores data regarding the detected and set play area in the play area storage section 255.

The play area setting section 264 includes a play area detecting function of automatically detecting the play area from the surrounding space of the user who wears the head-mounted display 100, on the basis of the camera image acquired by the camera image acquiring section 262. It is to be noted that the play area setting section 264 may include a play area editing function of accepting the user's operation for editing the play area that has been automatically detected and changing the shape of the play area according to the operation.

The line-of-sight direction detecting section 266 detects the position of the head and the posture of the user who wears the head-mounted display 100, on the basis of the angular velocity and the acceleration of the head-mounted display 100 detected by the motion sensor 134 of the head-mounted display 100 and the image around the head-mounted display 100 captured by the stereo camera 110. The line-of-sight direction detecting section 266 further detects the position of the viewpoint and the line-of-sight direction of the user, on the basis of the position of the head and the posture of the user. Detection of the position of the head and the posture of the user and the position of the viewpoint of the user and the line-of-sight direction of the user may be carried out by use of a publicly known technique.

The look-around screen generating section 268 generates data on the look-around screen that is a screen for allowing the user to look around the play area. In the look-around screen, a predetermined special image is superimposed on an image representing the play area, and within the special image, the region that coincides with the line-of-sight direction of the user changes a display mode different than before. The look-around screen generating section 268 sets the special image in a space that is a surrounding space around the head-mounted display 100 and that has a range narrower than the maximum range of the play area.

Concurrently with the detection of the play area by the play area setting section 264, the map generating section 270 generates map data used for estimating the position of the user in the play area, on the basis of a plurality of camera images acquired by the camera image acquiring section 262 and in which the space around the user is captured from a plurality of directions. The map generating section 270 stores the generated map data in the map storage section 256. The map generating section 270 ends generation of the map, in a case in which a plurality of camera images that are obtained by capturing the surrounding space of the user from the plurality of directions and that are a predetermined number or more are input.

The position estimating section 272 executes tracking processing of estimating the position of the head-mounted display 100 (in other words, the user) in the real world, on the basis of the map data stored in the map storage section 256 and the camera image acquired by the camera image acquiring section 262. That is, the position estimating section 272 estimates the position of the head-mounted display 100 (in other words, the user) in the play area. For example, the position estimating section 272 collates a plurality of key frames included in the map data with the camera image, and may estimate the position of the head-mounted display 100 on the basis of the collation result and the position of the head-mounted display 100 and the line-of-sight direction associated with each key frame. In addition, the position estimating section 272 may estimate the position of the user with use of a publicly known self-position estimation technique, such as SLAM (Simultaneous Localization and Mapping).

The warning processing section 274 executes warning processing to the user, according to a relation between the boundary of the play area and the position of the user.

Figure 7:
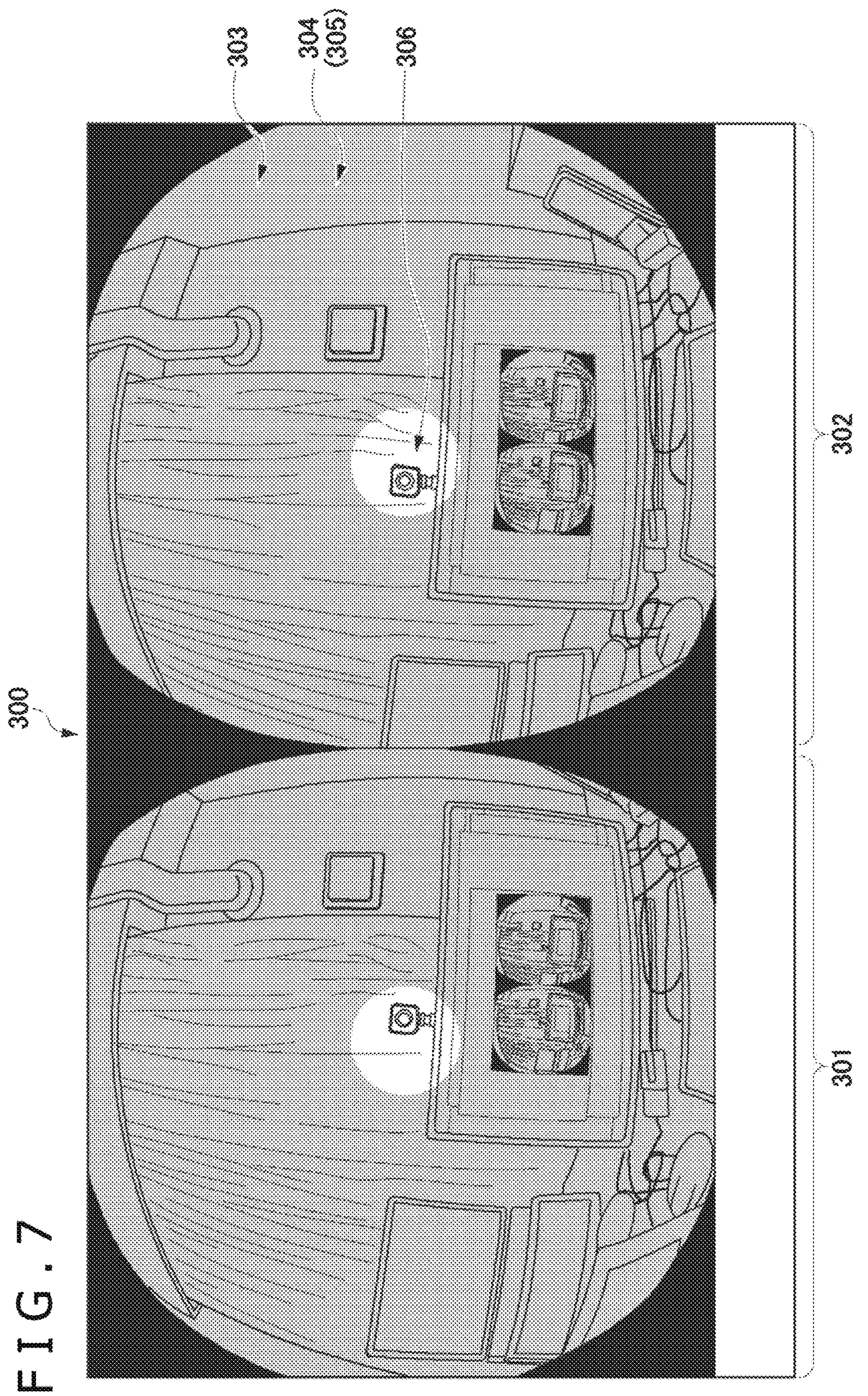
FIG. 7 is a view illustrating an example of a look-around screen.

FIG. 7 illustrates an example of the look-around screen. The look-around screen 300 in FIG. 7 indicates a left-eye image 301 and a right-eye image 302. Each of the left-eye image 301 and the right-eye image 302 includes an AR image obtained by video see-through, and specifically, is an image obtained by superimposing a special image 304 on a play area image 303. The play area image 303 is an image indicating the play area around the user, and in the embodiment, is an image obtained by capturing a situation of the real space around the user by the stereo camera 110 of the head-mounted display 100.

The special image 304 is an image indicated in a manner highlighting an unchecked region 305 by painting a region that has not coincided with the line-of-sight direction of the user in a predetermined color (also referred to as an "unchecked region 305"). The special image 304 indicates a region that has coincided with the line-of-sight direction of the user (also referred to as a "visually recognized region 306") and the unchecked region 305 in a different manner. Specifically, the look-around screen generating section 268 sets the unchecked region 305 in the special image 304 to a first transmittance (for example, the transmittance is 50%) and sets the visually recognized region 306 in the special image 304 to a second transmittance higher than the first transmittance (for example, the transmittance is 100%). As a modified example, the look-around screen generating section 268 may change the special image 304 in the visually recognized region 306 undisplayed or may erase the special image 304 in the visually recognized region 306.

The unit shape of the visually recognized region 306 that is a region in which the displayed mode (the transmittance, in the embodiment) is changed in the special image 304 in a case in which the region coincides with the line-of-sight direction of the user, in other words, the unit shape of which transmittance is temporarily changed, is a circle. In addition, the size of the circle as the unit shape (that is, the unit size of the visually recognized region 306) is 40 cm in diameter in an apparent size in the virtual space.

Figure 8:
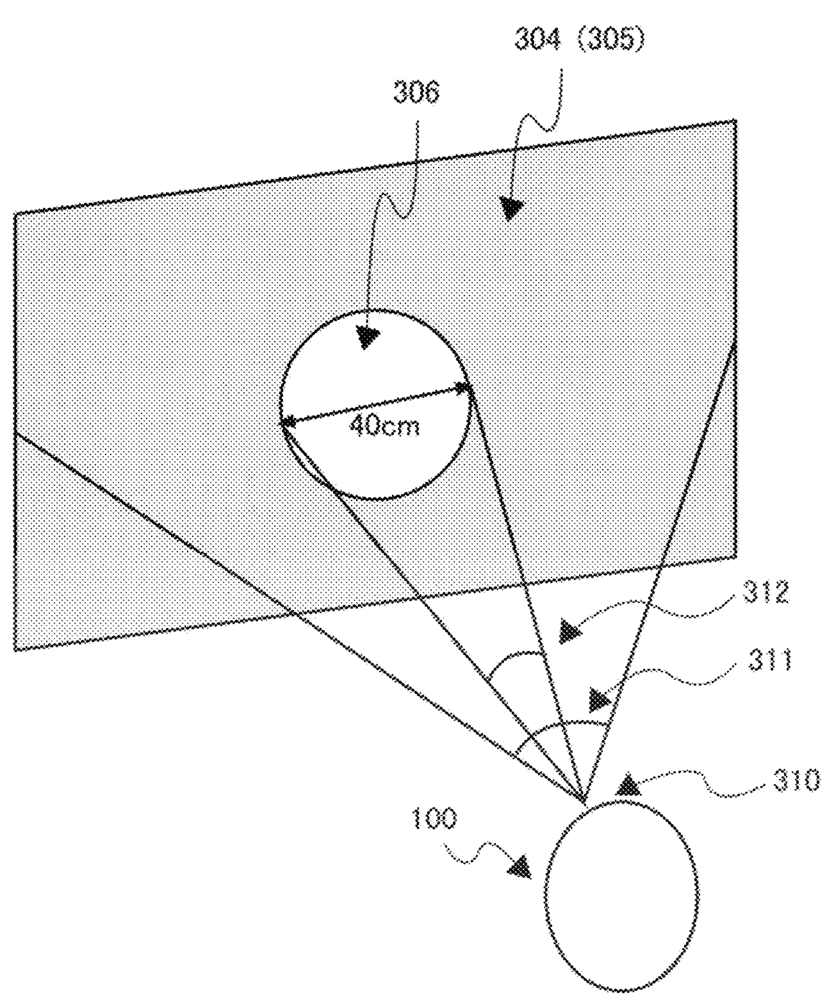
FIG. 8 is a view illustrating a unit shape of a visually recognized region.

FIG. 8 indicates the unit shape of the visually recognized region 306. A viewing angle 311 of the head-mounted display 100 is 120 degrees. As described later, the special image 304 is provided at a position 50 cm apart from the viewpoint 310 of the user. The diameter of 40 cm of the circle as the unit shape of the visually recognized region 306 is determined such that an angle 312 formed between both ends of the circle and the viewpoint 310 of the user becomes approximately 40 degrees. A value of the angle 312 may be a value within an appropriate range in which a rotational amount of the head that the user is to be performed is included, the value having been derived by knowledge of the developer and experiment made by the developer, and may be, for example, a value of 40 to 44 degrees.

Figure 9:
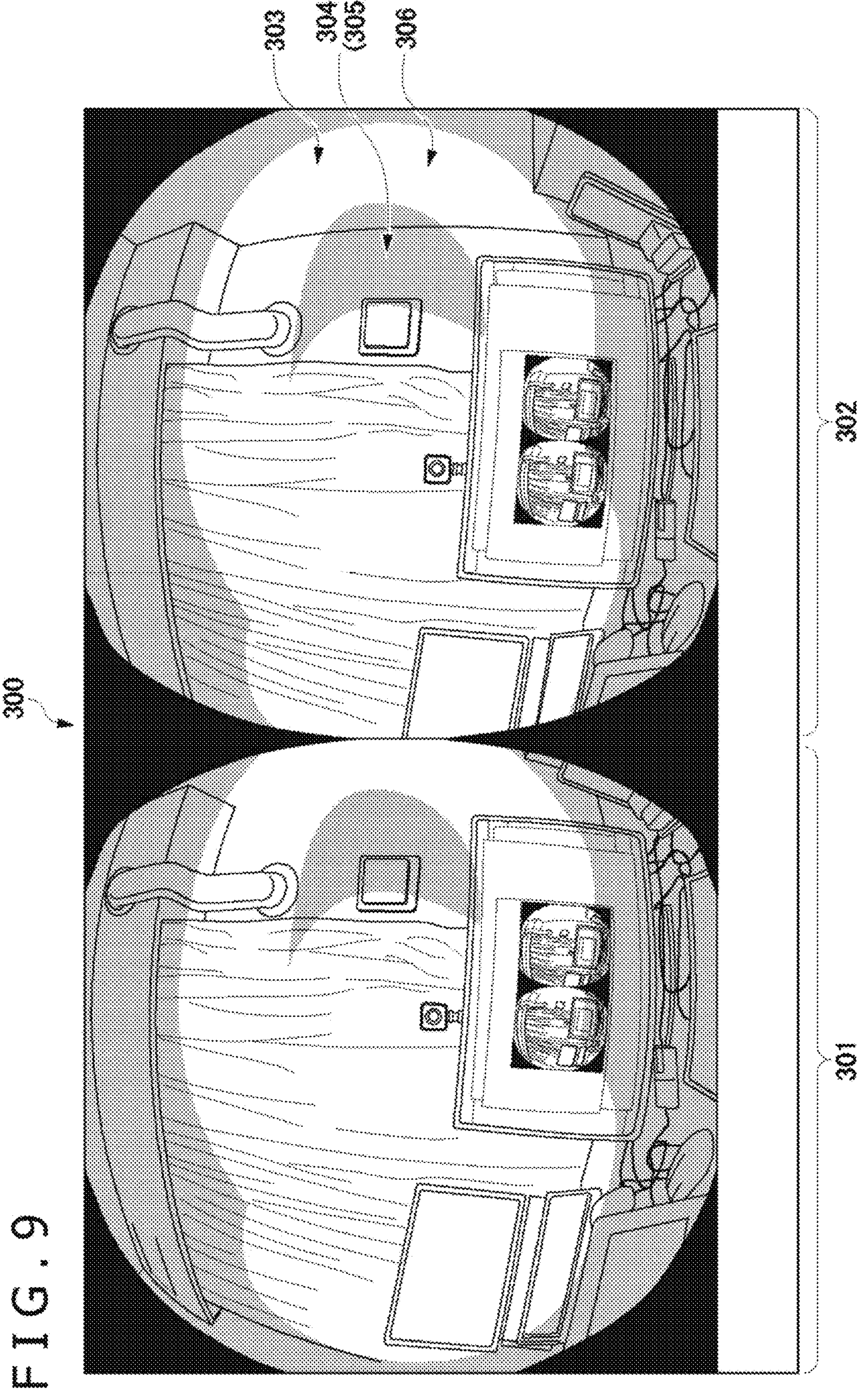
FIG. 9 is a view illustrating an example of a look-around screen.

The look-around screen generating section 268 generates the look-around screen 300 in which the whole region of the play area image 303 is covered with the special image 304 having the first transmittance (for example, the transmittance is 50%), as the look-around screen 300 in an initial state. As illustrated in FIG. 9, the look-around screen generating section 268 generates the look-around screen 300 in which the region of the special image 304 having the second transmittance (for example, the transmittance is 100%) (that is, the visually recognized region 306) is gradually enlarged, as the user looks around the surroundings. As a modified example, in a case in which the special image 304 of the visually recognized region 306 is changed undisplayed, the look-around screen generating section 268 generally narrows down the display region of the special image 304, as the user looks around the surroundings.

Thus, as the user looks around the surroundings, the image display system 10 in the embodiment can provides UI in which the field of view covered with translucent paint gradually becomes clear, thereby providing such UX that makes the user want to look around the surroundings of the user. As a result, generation of the detailed map data and tracking with high accuracy can be achieved.

The look-around screen generating section 268 gradually changes the transmittance at the boundary between the unchecked region 305 in the special image 304 and the visually recognized region 306. Specifically, the look-around screen generating section 268 sets the gradation from the unchecked region 305 in the special image 304 over the visually recognized region 306, in such a manner as to gradually enhance the transmittance from the first transmittance (for example, the transmittance is 50%) to the second transmittance (for example, the transmittance is 100%). As a result, a depth conflict of the user can be suppressed, and accordingly, 3D sickness of the user can be suppressed.

Figure 10:
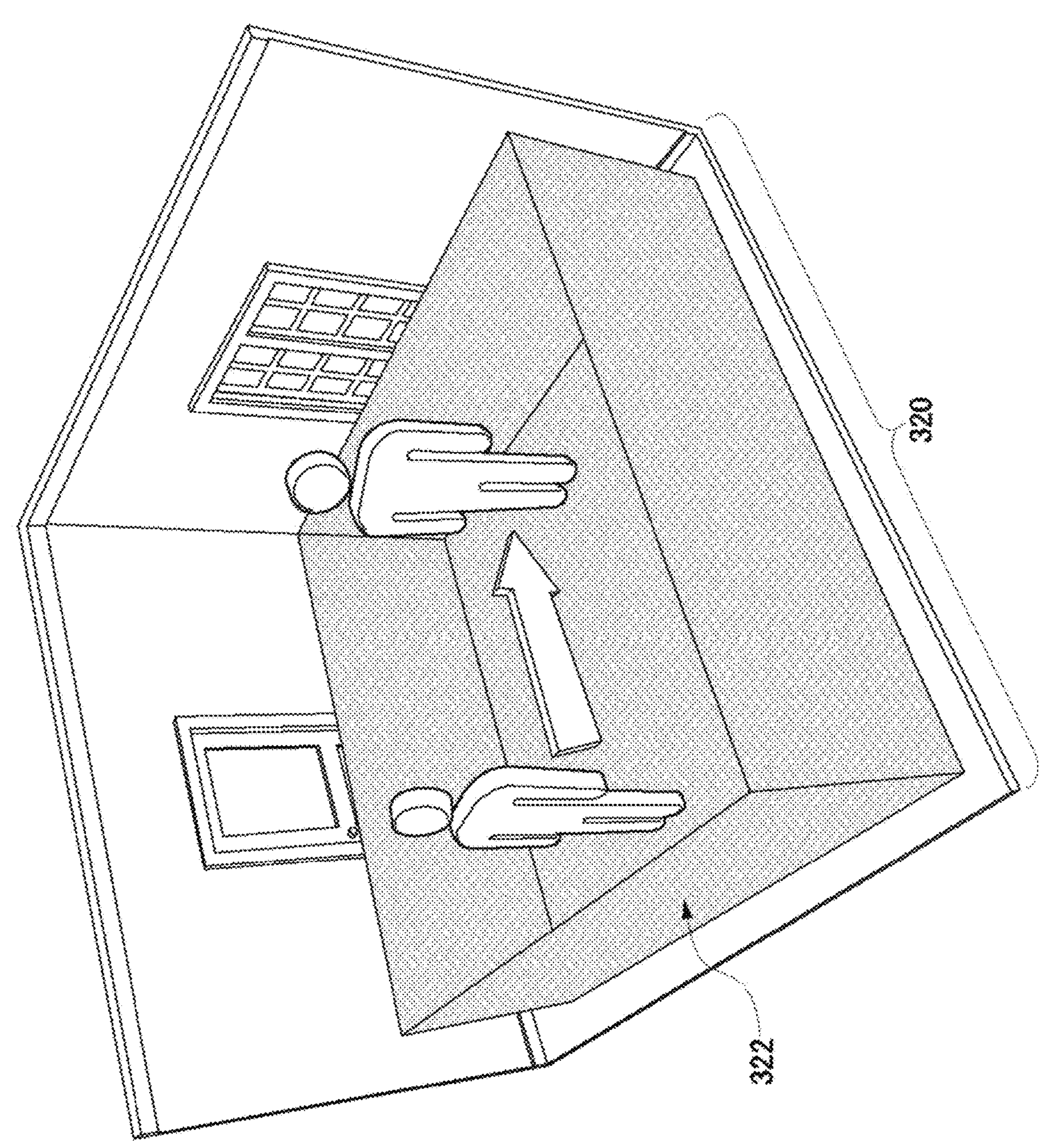
FIG. 10 is a view illustrating a range of the visually recognized region to be stored.

FIG. 10 indicates the range of the visually recognized region that is a storage target. The visually recognized region is a region having been viewed by the user, in other words, a region which has coincides with the line-of-sight direction of the user. In the image display system 10 in the embodiment, the maximum range of the play area 320 is defined as five meters long and five meters wide. Accordingly, to be exact, it is necessary to store where the user has looked with a space (cube) having the area of five meters long and five meters wide as a storage target region 322, in the visually recognized region storage section 257. In this case, the visually recognized region storage section 257 needs a large capacity of memory.

Figure 11:
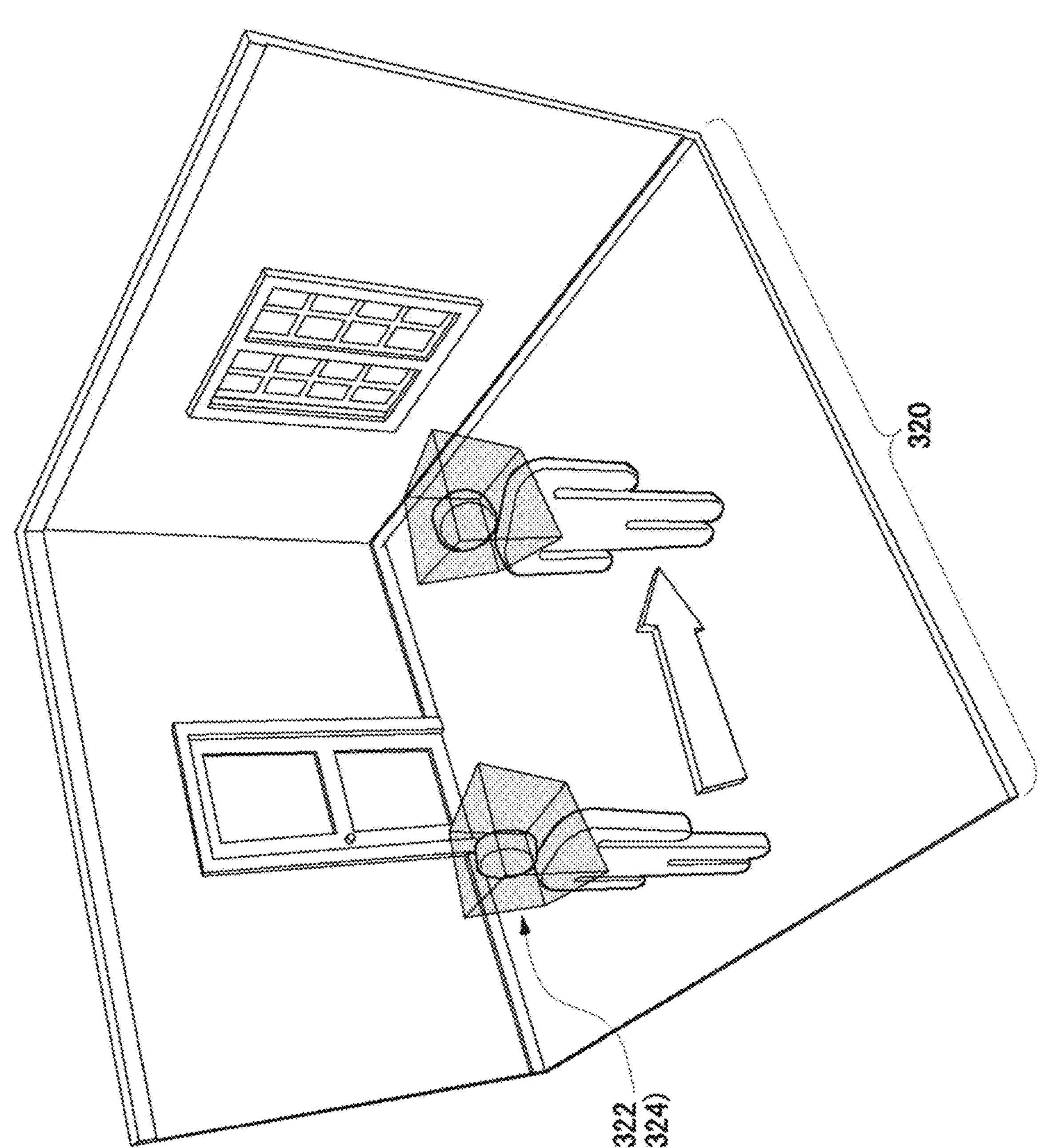
FIG. 11 is a view illustrating a range of the visually recognized region to be stored.

FIG. 11 also illustrates the range of the visually recognized region that is the storage target. As illustrated in FIG. 11, in the embodiment, with a specified space 324 that is a space in a range narrower than the maximum range of the play area 320 as the storage target region 322, where the user has looked is stored in the visually recognized region storage section 257. The storage target region 322 (that is, the specified space 324) in the embodiment is a cube including six squares each having one meter long and one meter wide. The look-around screen generating section 268 draws the special image 304 on each face of the cube of the specified space 324. Accordingly, the special image 304 is drawn 50 cm ahead from the viewpoint of the user. The look-around screen generating section 268 may adopt a publicly known cube map (also referred to as a "texture cube") technique to draw the special image 304 on each face of the cube of the specified space 324.

It is preferable that the drawing position of the special image 304 be in front of the boundary of the play area. When the special image 304 is drawn on the far side of the boundary of the play area (for example, the wall of the room), a depth conflict is likely to occur in the user, and consequently, the user may be likely to feel 3D sickness. Accordingly, it is preferable to locate the drawing position of the special image 50 cm ahead from the viewpoint of the user. In addition, in the head-mounted display 100, the position at which the head-mounted display 100 comes into best focus (a focal length of a displayed video) is 2 m ahead from the viewpoint. The drawing position of the special image is set on the near side of the focal length of the head-mounted display 100.

The look-around screen generating section 268 specifies the region (visually recognized region) which coincides with the line-of-sight direction of the user detected by the line-of-sight direction detecting section 266 in the specified space 324 (each face of the cube), and stores data indicating the position of the visually recognized region in the specified space 324 in the visually recognized region storage section 257. The data indicating the position of the visually recognized region may be coordinate values in the coordinate system having the viewpoint of the user set as an origin or may be coordinate values of the region which coincides with a support direction of the user in each face of the cube constituting the specified space 324. The look-around screen generating section 268 sets the transmittance of the visually recognized region stored in the visually recognized region storage section 257 higher than the transmittance of the unchecked region, at a time of drawing the special image 304.

In addition, as illustrated in FIG. 11, the look-around screen generating section 268 changes the position of the specified space 324 (each face of the cube), following change of the position of the head-mounted display 100 (the head of the user). For example, in a case in which the position of the head-mounted display 100 is changed, the look-around screen generating section 268 causes the specified space 324 to be shifted in parallel by the amount of the change.

In contrast, the look-around screen generating section 268 keeps the specified space 324 (cube) from being pivotably rotated, even if the head-mounted display 100 (the head of the user) is pivotably rotated. In other words, the look-around screen generating section 268 keeps the angle of the specified space 324 from being changed, even if the posture of the head-mounted display 100 is changed. As such, in the embodiment, the visually recognized region only in the surrounding space of the head-mounted display 100 is recorded, so that it is possible to reduce the used amount of the memory of the visually recognized region storage section 257 by a great extent.

The operations of the image display system 10 adopting the configurations described above will be described.

Figure 12:
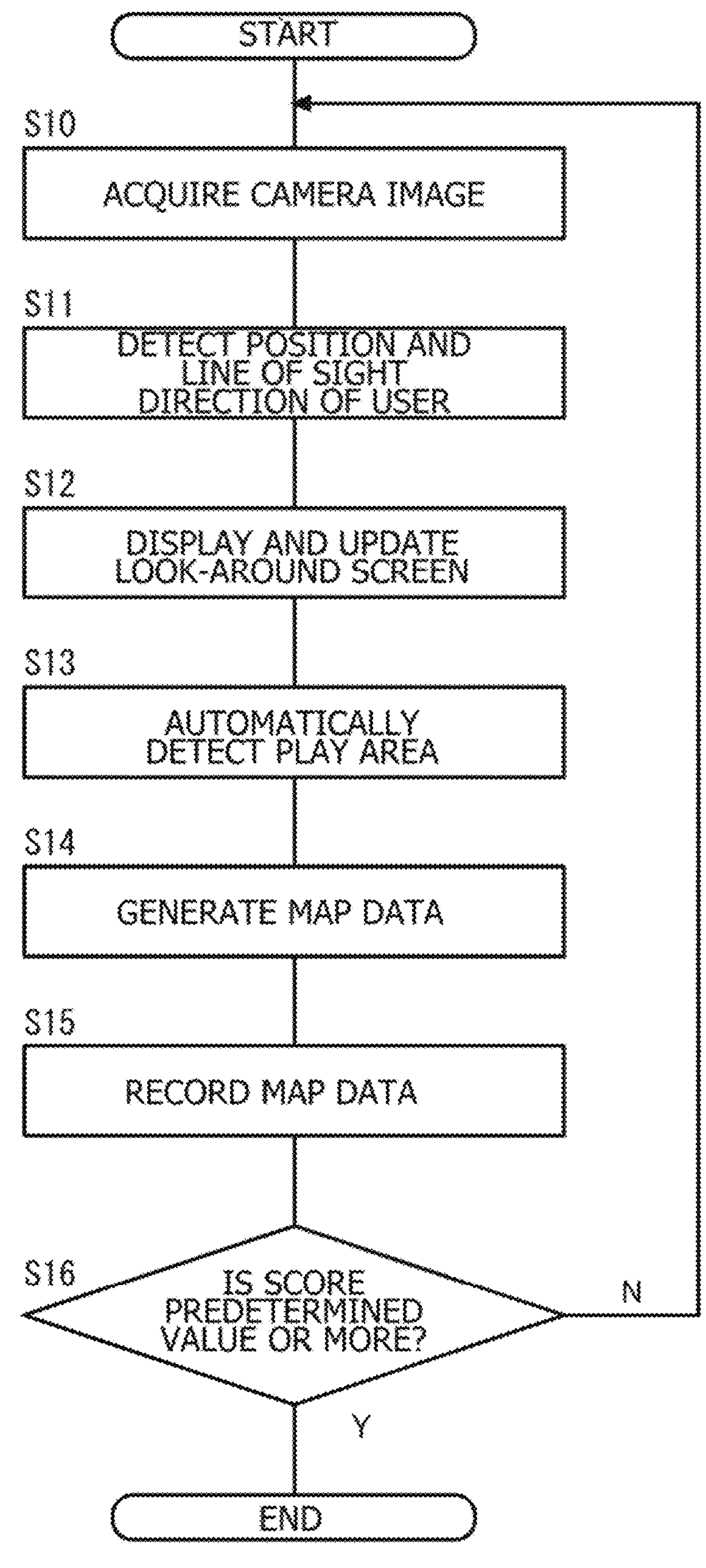
FIG. 12 is a flowchart indicating an operation of the image generation device.

FIG. 12 is a flow chart indicating the operation of the image generation device 200. The system section 260 of the image generation device 200 causes the setting menu of the image display system 10 to be displayed on the head-mounted display 100. In a case in which the initial settings in the setting menu is selected by the user, the head-mounted display 100 starts transmission of the camera image obtained by capturing the real space in the line-of-sight direction of the user and various types of sensor data to the image generation device 200. The sensor data includes a measured value measured by the motion sensor 134, and for example, includes the angular velocity and the acceleration of the head-mounted display 100. The camera image acquiring section 262 of the image generation device 200 acquires the camera image transmitted by the head-mounted display 100 (S10).

Figure 13:
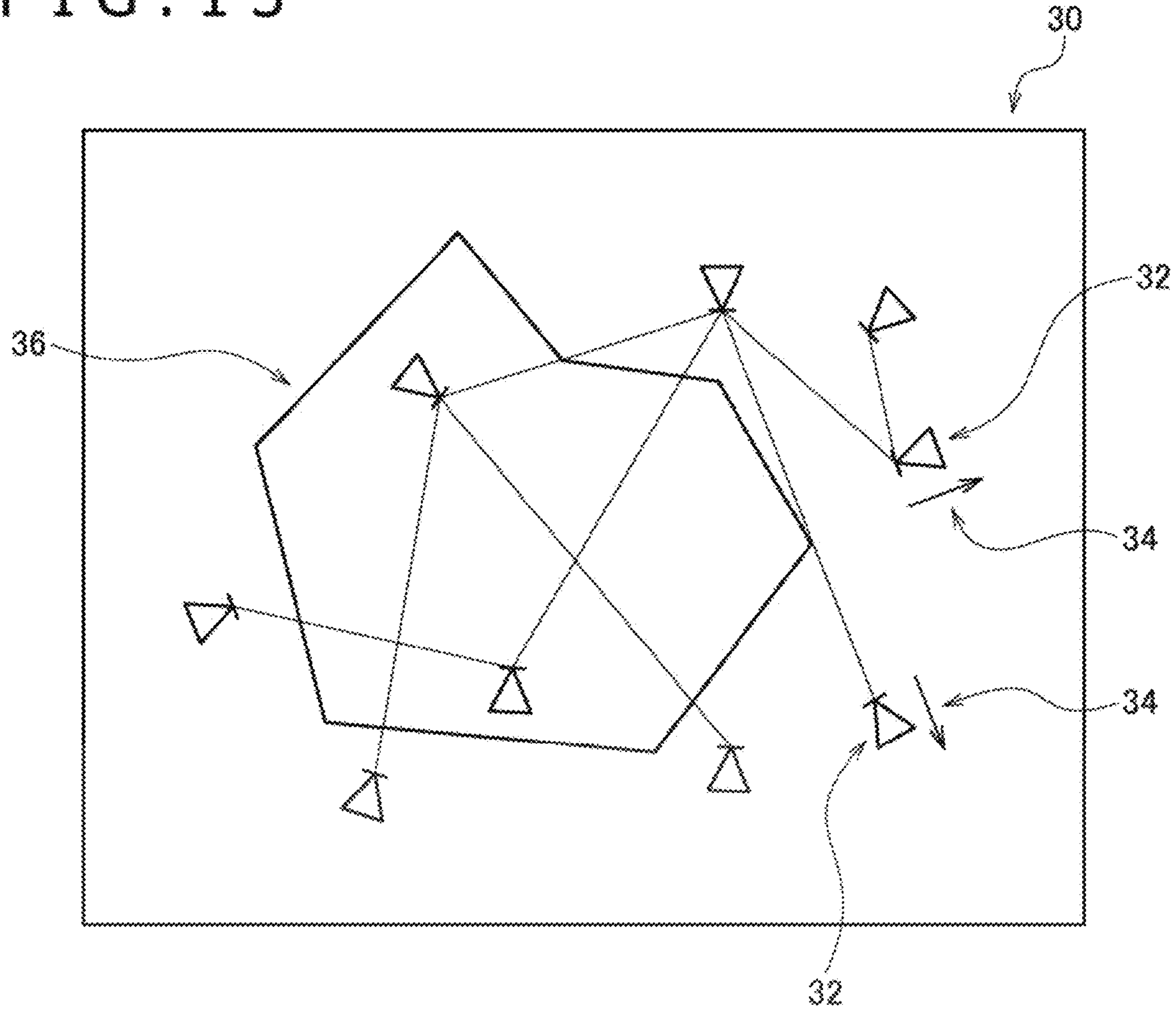
FIG. 13 is a diagram schematically illustrating the behavior of a user at a time of initial settings.

FIG. 13 schematically illustrates the behavior of the user at the initial settings. In a room 30, the user wears the head-mounted display 100 on the head thereof and moves looking around the surroundings thereof. In FIG. 13, a user 32 represents the position of the user at this time. An arrow mark 34 represents the line-of-sight direction of the user. A play area 36 represents one example of the play area that is to be set. The line-of-sight direction detecting section 266 of the image generation device 200 detects the position of the head-mounted display 100 (the head of the user) and the line-of-sight direction, on the basis of the camera image acquired by the camera image acquiring section 262 as well as the angular velocity and the acceleration of the head-mounted display 100 detected by the sensor of the head-mounted display 100, or the like (S11).

The look-around screen generating section 268 of the image generation device 200 identifies the region which coincides with the line-of-sight direction of the user (for example, the point cloud at each face of the cube constituting the specified space 324, or the like) as the visually recognized region, in a predetermined specified space 324 that is narrower than the maximum size of the play area 320 (five meters long and five meters wide). The map generating section 270 stores data indicating the visually recognized region in the specified space 324 in the visually recognized region storage section 257.

The look-around screen generating section 268 generates data regarding the look-around screen including the camera image (in other words, the play area image 303) acquired by the camera image acquiring section 262. That is, the look-around screen generating section 268 carries out video see-through which enables the user to view the situation of the real space in the direction in which the user is facing. Accordingly, the safety of the user is increased.

In addition, the look-around screen generating section 268 sets the translucent special image 304 in the specified space 324 (each face of the cube). Specifically, the look-around screen generating section 268 sets the translucent special image 304 to a region (unchecked region) excluding the visually recognized region and which is stored in the visually recognized region storage section 257 in the specified space 324 (each face of the cube). Then, the look-around screen generating section 268 generates data on the look-around screen including an AR image obtained by superimposing the special image 304 on the play area image 303. The display controlling section 292 causes the display section 124 of the head-mounted display 100 to display the look-around screen (S12). The user looks around the surroundings, viewing the look-around screen.

The play area setting section 264 of the image generation device 200 automatically detects the play area in the surrounding space of the user, on the basis of the camera image and the sensor data acquired in S10 (S13). For example, the play area setting section 264 may estimate, on the basis of the camera image and the sensor data corresponding to the camera image, a 3D shape of the room of the user by a publicly known method. The play area setting section 264 may detect a plane perpendicular to the direction of gravity (typically, a floor surface) that is indicated by the sensor data, on the basis of the estimated 3D shape of the room, and may detect a result obtained by combining a plurality of planes detected and having the same height, as the play area. The play area setting section 264 stores the play area data including coordinate values including point cloud forming the boundary of the play area in the play area storage section 255.

Figure 14:
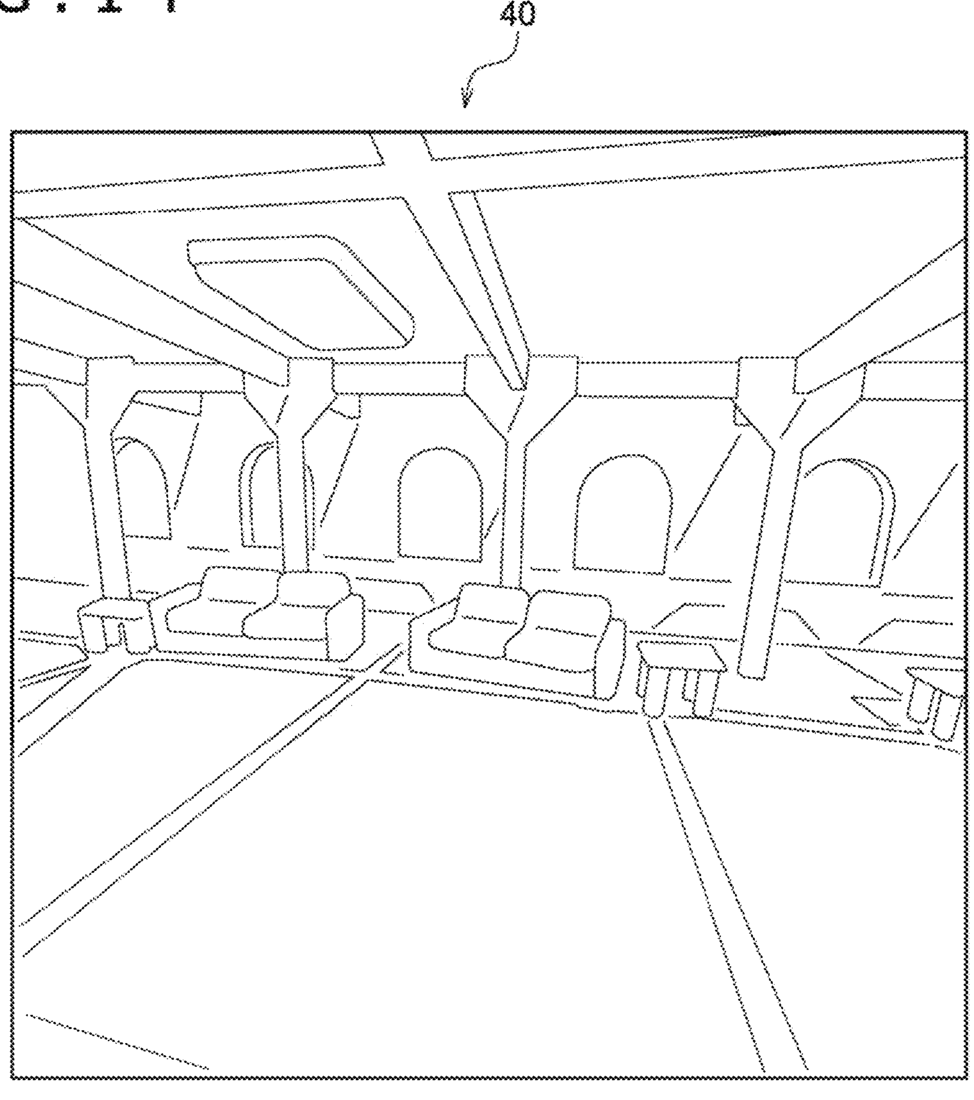
FIG. 14 is a view illustrating an example of a camera image.
Figure 15:
FIG. 15 is a view illustrating an example of a key frame.
Figure 15:
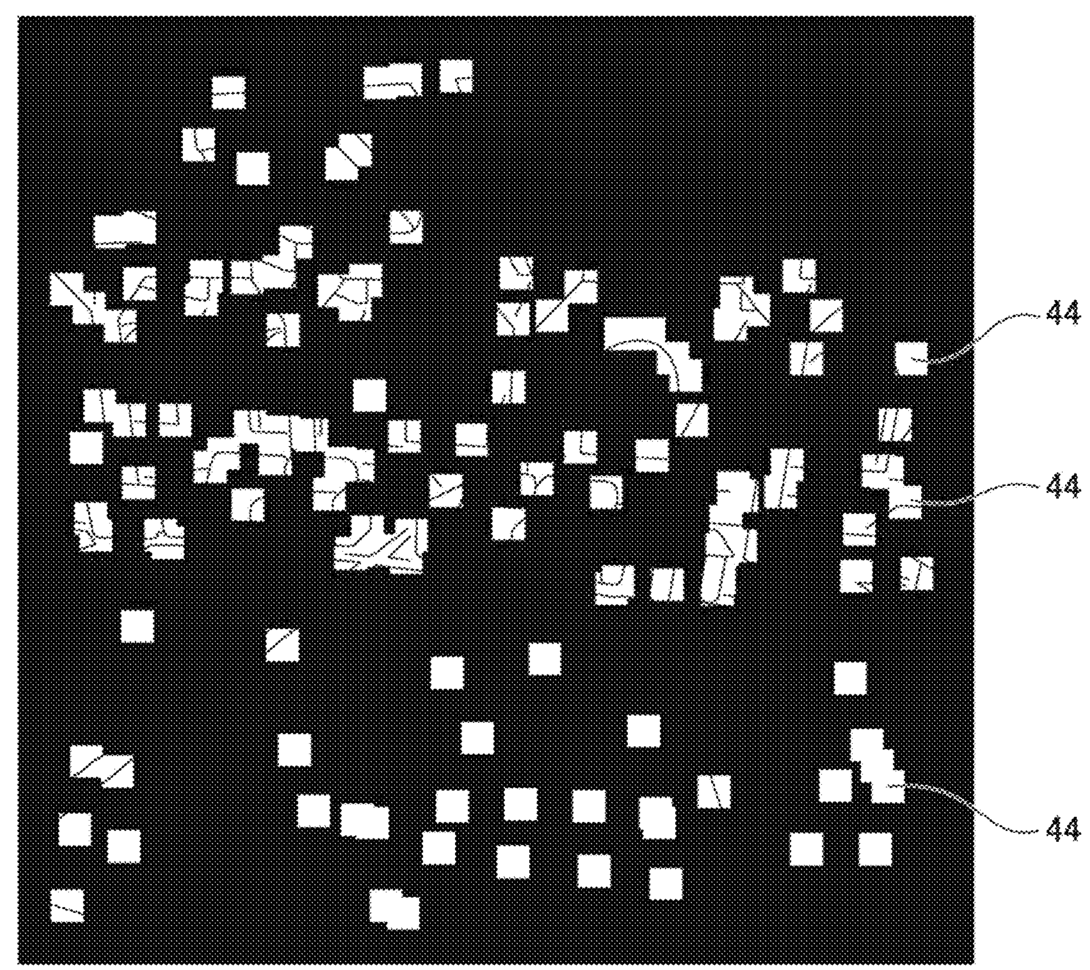

The map generating section 270 of the image generation device 200 generates map data for estimating the position of the user, concurrently with the process in S13, on the basis of the camera image and the sensor data acquired in S10 (S14). FIG. 14 illustrates an example of the camera image, and FIG. 15 illustrates an example of the key frame. The map generating section 270 extracts a plurality of feature points 44 included in the camera image 40 by use of a publicly known method such as a corner detection method, and generates the key frame 42 indicating the plurality of feature points 44 thus extracted. In a case in which 24 or more of the feature points 44 are extracted from one camera image 40, the map generating section 270 stores map data obtained by associating the key frame 42 including 24 or more of the extracted feature points 44 with the position and the line-of-sight direction of the user which are specified by the sensor data in the map storage section 256 (S15).

The map generating section 270 stores a plurality of references (referred to as "bins" below) for deriving scores a score regarding the percentage at which an area in the surrounding space of the user is covered by the input camera image (in the embodiment, the key frame generated from the camera image). A plurality of bins are a plurality of references obtained by dividing the surrounding space of the user by different modes.

Figure 16:
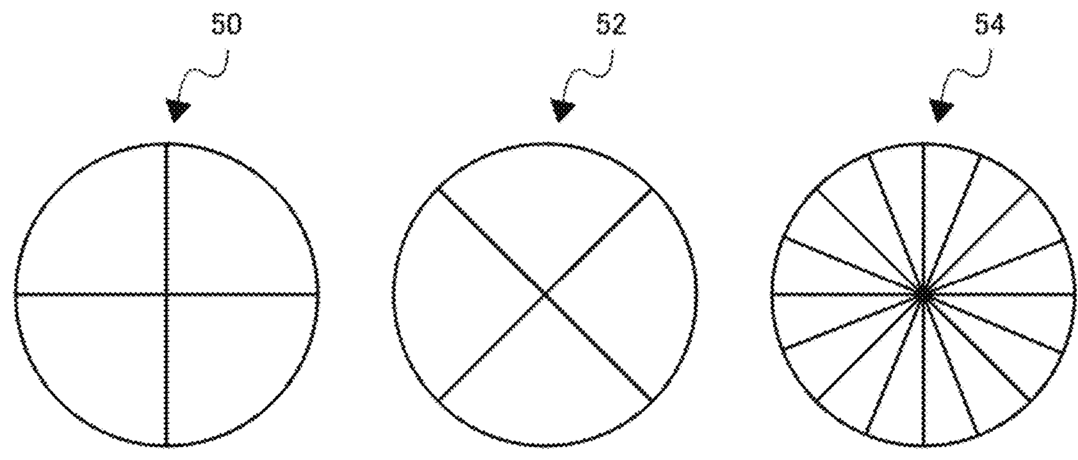
FIG. 16 is a view illustrating a plurality of bins.

FIG. 16 indicates the plurality of bins. Each of a bin 50, a bin 52, a bin 54 sets a center as the position of the user, and is obtained by dividing the surrounding space of the user with the direction of gravity as the axis. The bin 50 is a reference obtained by dividing the surrounding space of the user into four parts at the central angle of 90°, on the basis of the line-of-sight direction of the user at the time of starting the settings for the play area and the direction perpendicular to the line-of-sight direction. The bin 52 is obtained by phase-shifting the bin 50 by 45°. The bin 54 is a reference obtained by dividing the surrounding space of the user into 16 parts at the central angle of 22.5°. In the following description, an area that is defined by each of the bin 50, the bin 52, the bin 54 and that is obtained by dividing the surrounding space of the user is referred to as a "divided area."

The map generating section 270 derives the score regarding the percentage at which an area of the surrounding space of the user is covered by a plurality of input camera images (in the embodiment, key frames generated by the camera images), on the basis of the bin 50, the bin 52, and the bin 54. In a case in which the score is equal to or more than a threshold, the map generating section 270 ends the generation processing of the map.

Specifically, in a case in which the key frames are generated from the camera images, the map generating section 270 assumes that the divided area which coincides with the line-of-sight direction in which the corresponding key frame is obtained for each of the bin 50, the bin 52, and the bin 54 has been filled, and counts the total of the number of divided areas filled in each bin, as the score. When generating a new key frame, the map generating section 270 adds the number of divided areas newly filled in each bin according to a similar algorithm, to the score.

Returning to FIG. 12, in the embodiment, when the score is less than the threshold "10" (N in S16), the process returns to S10, and the processes such as an updating process of the look-around screen, a detecting process of the play area, and a generating process of the map are repeated. When the score is the threshold "10" or more (Y in S16), the play area setting section 264 ends the detecting process of the play area, and the map generating section 270 ends the generating process of the map. The threshold "10" of the score is a value which can exceed if the user wearing the head-mounted display 100 look around the surroundings thereof at 180° but which cannot exceed if the user does not look around the surroundings.

Figure 17:
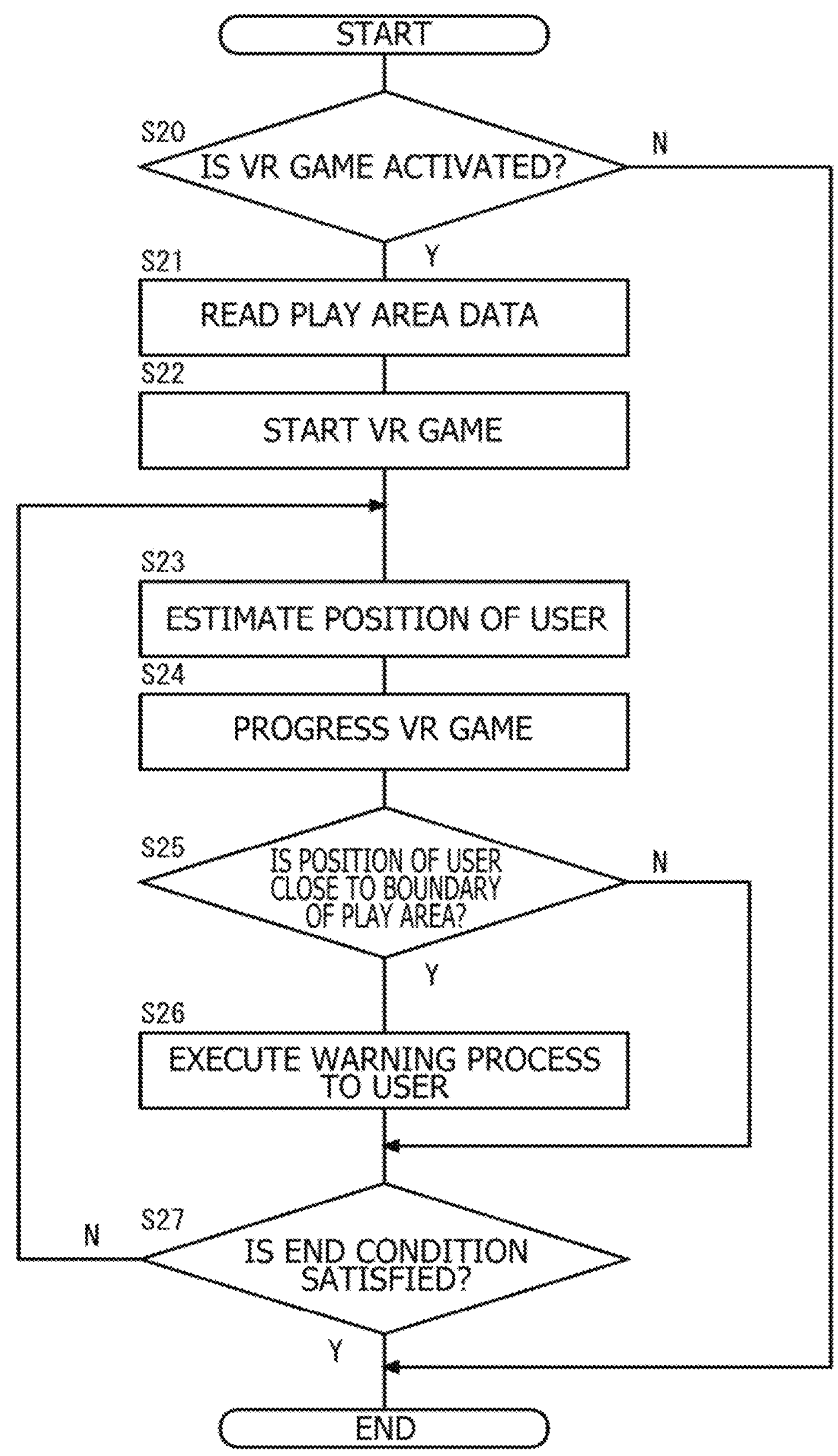
FIG. 17 is a flowchart indicating an operation of the image generation device.

FIG. 17 is also a flow chart indicating operations of the image generation device 200. FIG. 17 indicates an operation at a time of executing a VR game. When the user activates the VR game in the image generation device 200 (Y in S20), the App executing section 290 of the image generation device 200 reads data on the play area stored in the play area storage section 255, for example, data indicating the shape and the size of the play area (S21).

The App executing section 290 reads program data on the VR game from the App storage section 254, and starts the VR game (S22). For example, the App executing section 290 disposes game items in a range of the play area in the virtual space in which the game world is drawn, thereby allowing the user to acquire the item. The display controlling section 292 causes the game image (for example, the VR image) generated by the App executing section 290 to be displayed on the display section 124 of the head-mounted display 100.

The camera image acquiring section 262 of the image generation device 200 sequentially acquires the camera images sequentially transmitted from the head-mounted display 100, and the position estimating section 272 of the image generation device 200 sequentially estimates the position of the user and the line-of-sight direction of the user in the real world (S23). The App executing section 290 progresses the VR game, on the basis of the position of the user and the line-of-sight direction of the user estimated by the position estimating section 272 (S24). For example, the App executing section 290 may move a user character in the VR game, according to change in the position of the user in the real world (in other words, in the play area).

In a case in which the position of the user in the real world comes close to the boundary of the play area, for example, in case in which a distance from the head-mounted display 100 worn by the user to the boundary of the play area is equal to or less than a predetermined threshold (for example, 30 cm) (Y in S25), the warning processing section 274 of the image generation device 200 detects this state. The warning processing section 274 executes a predetermined warning process for the user (S26).

For example, in a case in which the position of the user comes close to the boundary of the play area, the warning processing section 274 may transmit the image indicating the boundary of the play area to the display controlling section 292. The display controlling section 292 may cause an image obtained by superimposing the image indicating the boundary of the play area on the game image generated by the App executing section 290 to be displayed as a display image on the display section 124 of the head-mounted display 100. In addition, in a case in which the position of the user in the real world comes close to the boundary of the play area or exceeds the boundary of the play area, the warning processing section 274 may cause the display section 124 of the head-mounted display 100 to display a video see-through image through the display controlling section 292. In contrast, in a case in which the position of the user in the real world is not close to the boundary of the play area (N in S25), the process in S26 is skipped.

In a case in which the user stops the execution of the VR game, i.e., in a case in which a predetermined end condition is satisfied (Y in S27), the flow in the figure ends. In a case in which the end condition is not satisfied (N in S27), the process returns to S23, and the VR game continues. When the VR game is not activated (N in S20), the processes subsequent to S21 are skipped.

The present invention has been described above on the basis of the embodiment. Those skilled in the art would understand that this embodiment is an example, various variations are possible in combinations of respective components or processing processes in the embodiment, and such variations also fall within the scope of the present invention.

A modified example will be described. In the embodiment above, the play area image 303 to be set behind the special image 304 in the look-around screen 300 is assumed to be an image obtained by capturing the real space around the user. As the modified example, the play area image 303 in the look-around screen 300 may be a VR image indicating the play area in the virtual world.

Another modified example will be described. In the embodiment, at least some of a plurality of functions implemented in the image generation device 200 may be implemented in the head-mounted display 100, and may be implemented in a server connected to the image generation device 200 through the network. For example, the head-mounted display 100 may include a function of generating data on various types of screens and images, on the basis of camera images and sensor measurement values. In addition, the server may include the function of generating data on various types of screens and images, on the basis of camera images and sensor measurement values, and the head-mounted display 100 may display the screen and the image generated by the server.

Any combination of the above-described embodiment and modified examples is also useful as an embodiment of the present disclosure. A new embodiment resulting from the combination has combined effects of the combined embodiment and modified examples. Further, it is also to be understood by those skilled in the art that the function to be fulfilled by each constituent element described in the claims is implemented by one of the individual components described in the embodiment and modified examples or by cooperation therebetween.

The technical idea based on the description of the embodiment and modified examples can be expressed in modes indicated in the following items.

[Item 1]

An information processing device including:

a look-around screen generating section which generates a look-around screen that is a screen for allowing a user who wears the head-mounted display to look around a play area in which the user is able to move during a play of an application;

a display controlling section which causes the look-around screen to be displayed on the head-mounted display; and a map generating section which generates a map for estimating a position of the user in the play area, on the basis of a plurality of camera images obtained by capturing a space around the user in a plurality of directions by a camera of the head-mounted display, in which, in the look-around screen, a predetermined special image is superimposed on an image indicating the play area, and a region which has coincided with a line-of-sight direction of the user in the special image changes a display mode different than before, and the look-around screen generating section sets the special image in a space around the head-mounted display and narrower than a maximum range of the play area. According to the information processing device above, it is possible to achieve provision of UX which makes the user who wears the head-mounted display want to look around the surroundings thereof with a small amount of memory.

[Item 2]

The information processing device according to Item 1, in which the look-around screen generating section changes a position of a specified space which is a space for setting the special image, following change of a position of the head-mounted display.

According to the information processing device above, it is possible to continuously provide the UX which makes the user want to look around the surroundings thereof even if the position of the user changes.

[Item 3]

The information processing device according to Item 2, in which the look-around screen generating section does not cause the specified space to pivotably rotate, even if the head-mounted display pivotably rotates.

According to the information processing device above, it is possible to reduce a processing load and an amount of memory for displaying the special image in the specified space.

[Item 4]

The information processing device according to any one of Items 1 to 3, in which, in the look-around screen, a first transmittance is set to a region which has not coincided with the line-of-sight direction of the user in the special image, and a second transmittance higher than the first transmittance is set to the region which has coincided with the line-of-sight direction of the user in the special image. According to the information processing device above, it is possible to provide the UX which makes the user want to look around the surroundings thereof, since the play area of the region that the user has looked is displayed more sharply than before.

[Item 5]

The information processing device according to Item 4, in which the look-around screen generating section gradually changes a transmittance at a boundary between the region which has not coincided with the line-of-sight direction of the user in the special image and the region which has coincided with the line-of-sight direction of the user in the special image.

According to the information processing device above, it is possible to suppress the depth conflict and 3D sickness.

[Item 6]

The information processing device according to any one of Items 1 to 5, in which a size of a region whose display mode is changed in a case in which the region has coincided with the line-of-sight direction of the user in the special image is determined such that an angle formed by both ends of the region and a viewpoint of the user is approximately 40°. According to the information processing device above, it is possible to allow the rotational amount of the head of the user to be performed to fall within a suitable range.

[Item 7]

An information processing method causing a computer to execute:

a step of generating a look-around screen that is a screen for allowing a user who wears the head-mounted display to look around a play area in which the user is able to move during a play of an application;

a step of causing the look-around screen to be displayed on the head-mounted display; and a step of generating a map for estimating a position of the user in the play area, on the basis of a plurality of camera images obtained by capturing a space around the user in a plurality of directions by a camera of the head-mounted display, in which, in the look-around screen, a predetermined special image is superimposed on an image indicating the play area, and a region which has coincided with a line-of-sight direction of the user in the special image changes a display mode different than before, and the look-around screen generating section sets the special image in a space around the head-mounted display and narrower than a maximum range of the play area. According to the information processing device above, it is possible to achieve the provision of the UX which makes the user who wears the head-mounted display want to look around the surroundings thereof with a small amount of memory.

[Item 8]

A computer program causing a computer to realize:

a function of generating a look-around screen that is a screen for allowing a user who wears the head-mounted display to look around a play area in which the user is able to move during a play of an application;

a function of causing the look-around screen to be displayed on the head-mounted display; and a function of generating a map for estimating a position of the user in the play area, on the basis of a plurality of camera images obtained by capturing a space around the user in a plurality of directions by a camera of the head-mounted display, in which, in the look-around screen, a predetermined special image is superimposed on an image indicating the play area, and a region which has coincided with a line-of-sight direction of the user in the special image changes a display mode different than before, and the look-around screen generating section sets the special image in a space around the head-mounted display and narrower than a maximum range of the play area. According to the computer program above, it is possible to cause a computer to achieve the provision of the UX which makes the user who wears the head-mounted display want to look around the surroundings thereof, with a small amount of memory.

INDUSTRIAL APPLICABILITY

The technique of the present disclosure can be applied to an information processing device and an information processing system, for example.

REFERENCE SIGNS LIST

10: Image display system

100: Head-mounted display

200: Image generation device

262: Camera image acquiring section

268: Look-around screen generating section

270: Map generating section

292: Display controlling section

300: Look-around screen

The invention claimed is:

1. An information processing device comprising:

a memory comprising computer-executable instructions; and a processor configured to access the memory and execute the computer-executable instructions to perform operations comprising:

generating a screen that allows a user wearing a head-mounted display to look around a play area that the user is able to move during a play of an application, wherein the screen includes:

a predetermined special image superimposed on an image indicating the play area;

the predetermined special image is set in a first space around the head-mounted display and narrower than a maximum range of the play area; and a region coinciding with a line-of-sight direction of the user in the predetermined special image that changes a display mode different than before;

causing the screen to be displayed on the head-mounted display; and generating a map for estimating a position of the user in the play area based at least in part on a plurality of camera images obtained by capturing a second space around the user in a plurality of directions by a camera of the head-mounted display.

2. The information processing device according to claim 1, wherein, following change of a position of the head-mounted display, changing a position of a specified space for setting the predetermined special image.

3. The information processing device according to claim 2, wherein the operations further comprise, when the head-mounted display pivotably rotates. maintaining a rotational position of the specified space.

4. The information processing device according to claim 1, wherein the screen includes a first transmittance at a first region which has not coincided with the line-of-sight direction of the user in the predetermined special image and a second transmittance higher than the first transmittance is at a second region which has coincided with the line-of-sight direction of the user in the predetermined special image.

5. The information processing device according to claim 4, wherein the operations further comprise gradually changing a transmittance at a boundary between the first region which has not coincided with the line-of-sight direction of the user in the predetermined special image and the second region which has coincided with the line-of-sight direction of the user in the predetermined special image.

6. The information processing device according to claim 1, wherein the operations further comprise, where the display mode is changed, changing a size of the region such that an angle formed by both ends of the region and a viewpoint of the user is approximately 40°.

7. The information processing device according to claim 1, wherein the map is generated as each camera image of the plurality of camera images is obtained.

8. An computer-implemented method comprising:

generating a screen that allows a user who wearing a head-mounted display to look around a play area that the user is able to move during a play of an application, wherein the screen includes:

a predetermined special image superimposed on an image indicating the play area;

the predetermined special image is set in a first space around the head-mounted display and narrower than a maximum range of the play area; and a region coinciding with a line-of-sight direction of the user in the predetermined special image that changes a display mode different than before;

causing the screen to be displayed on the head-mounted display; and generating a map for estimating a position of the user in the play area of based at least in part on a plurality of camera images obtained by capturing a second space around the user in a plurality of directions by a camera of the head-mounted display.

9. The computer-implemented method according to claim 8, further comprising, following change of a position of the head-mounted display, changing a position of a specified space for setting the predetermined special image.

10. The computer-implemented method according to claim 9, further comprising, when the head-mounted display pivotably rotates, maintaining a rotational position of the specified space.

11. The computer-implemented method according to claim 8, wherein the screen includes a first transmittance at a first region which has not coincided with the line-of- sight direction of the user in the predetermined special image and a second transmittance higher than the first transmittance at a second region which has coincided with the line-of-sight direction of the user in the predetermined special image.

12. The computer-implemented method according to claim 11, further comprising gradually changing a transmittance at a boundary between the first region which has not coincided with the line-of-sight direction of the user in the predetermined special image and the second region which has coincided with the line-of-sight direction of the user in the predetermined special image.

13. The computer-implemented method according to claim 8, wherein the map is generated as each camera image of the plurality of camera images is obtained.

14. One or more non-transitory computer-readable media comprising computer-executable instructions that, when executed by one or more processors of an electronic device, cause the electronic device to perform operations comprising:

generating a screen that allows a user wearing a head-mounted display to look around a play area that the user is able to move during a play of an application, wherein the screen includes:

a predetermined special image superimposed on an image indicating the play area;

the predetermined special image is set in a first space around the head- mounted display and narrower than a maximum range of the play area; and a region coinciding with a line-of-sight direction of the user in the predetermined special image that changes a display mode different than before;

causing the screen to be displayed on the head-mounted display; and generating a map for estimating a position of the user in the play area based at least in part on a plurality of camera images obtained by capturing a second space around the user in a plurality of directions by a camera of the head-mounted display.

15. The one or more non-transitory computer-readable media according to claim 14, wherein the operations further comprise, following change of a position of the head-mounted display, changing a position of a specified space for setting the predetermined special image.

16. The one or more non-transitory computer-readable media according to claim 15, wherein the operations further comprise, when the head-mounted display pivotably rotates, maintaining a rotational position of the specified space.

17. The one or more non-transitory computer-readable media according to claim 14, wherein the screen includes a first transmittance at a first region which has not coincided with the line-of-sight direction of the user in the predetermined special image and a second transmittance higher than the first transmittance at a second region which has coincided with the line-of-sight direction of the user in the predetermined special image.

18. The one or more non-transitory computer-readable media according to claim 17, wherein the operations further comprise gradually changing a transmittance at a boundary between the first region which has not coincided with the line-of-sight direction of the user in the predetermined special image and the second region which has coincided with the line-of-sight direction of the user in the predetermined special image.

19. The one or more non-transitory computer-readable media according to claim 14, wherein the map is generated as each camera image of the plurality of camera images is obtained.

* * * * *